(12) United States Patent
Sharovar

(10) Patent No.: US 11,526,441 B2
(45) Date of Patent: Dec. 13, 2022

(54) HYBRID MEMORY SYSTEMS WITH CACHE MANAGEMENT

(71) Applicant: Truememorytechnology, LLC, Draper, UT (US)

(72) Inventor: Igor Sharovar, Draper, UT (US)

(73) Assignee: Truememory Technology, LLC, Draper, UT (US)

( * ) Notice: Subject to any disclaimer, the term of this patent is extended or adjusted under 35 U.S.C. 154(b) by 0 days.

(21) Appl. No.: 17/321,614

(22) Filed: May 17, 2021

(65) Prior Publication Data

US 2021/0271599 A1 Sep. 2, 2021

Related U.S. Application Data

(63) Continuation-in-part of application No. 16/994,233, filed on Aug. 14, 2020, now Pat. No. 11,055,220.

(60) Provisional application No. 62/889,001, filed on Aug. 19, 2019.

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/065* (2013.01); *G06F 3/0679* (2013.01); *G06F 2212/72* (2013.01)

(58) Field of Classification Search
CPC .. G06F 12/0813; G06F 12/06; G06F 12/0875; G06F 12/0893; G06F 12/0246; G06F 2212/0304; G06F 2212/60; G06F 9/542; G06F 9/546; G06F 12/0802; G06F 2212/72; G06F 3/0604; G06F 3/065; G06F 3/0679
See application file for complete search history.

(56) References Cited

U.S. PATENT DOCUMENTS

| | | |
|---|---|---|
| 7,178,001 B2 | 2/2007 | Mes |
| 8,397,013 B1 | 3/2013 | Rosen et al. |
| 8,516,187 B2 | 8/2013 | Chen et al. |
| 8,589,658 B2 | 11/2013 | Singh et al. |
| 8,762,607 B2 | 6/2014 | Cox et al. |
| 8,850,115 B2 | 9/2014 | Tremaine |
| 8,874,831 B2 | 10/2014 | Lee et al. |
| 8,880,777 B2 | 11/2014 | Kim et al. |
| 8,930,647 B1 | 1/2015 | Smith |

(Continued)

OTHER PUBLICATIONS

USPTO, Non-Final Office Action dated Nov. 25, 2020, in U.S. Appl. No. 16/994,233, 26 pgs.

(Continued)

*Primary Examiner* — Michael Krofcheck
(74) *Attorney, Agent, or Firm* — Henry Patent Law Firm PLLC

(57) ABSTRACT

In a general aspect, a hybrid memory system with cache management is disclosed. In some aspects, a memory module includes volatile memory, non-volatile memory, and an internal cache. The internal cache is communicably coupled with the volatile memory and the non-volatile memory. Whether to execute a memory access request is determined by operation of the memory module. In response to the inability of the memory access request to be executed, a data transferring process is performed to copy data between the volatile memory and the non-volatile memory via the internal cache.

20 Claims, 27 Drawing Sheets

(56) References Cited

U.S. PATENT DOCUMENTS

| | | |
|---|---|---|
| 9,152,584 B2 | 10/2015 | Kochar et al. |
| 9,170,744 B1 | 10/2015 | Smith |
| 9,171,585 B2 | 10/2015 | Rajan et al. |
| 9,182,914 B1 | 11/2015 | Smith |
| 9,195,395 B1 | 11/2015 | Smith |
| 9,223,507 B1 | 12/2015 | Smith |
| 9,645,746 B2 | 5/2017 | Berke et al. |
| 9,645,919 B2 | 5/2017 | Chen et al. |
| 9,824,734 B2 | 11/2017 | Cho et al. |
| 10,474,584 B2 | 11/2019 | Chang et al. |
| 2010/0017556 A1* | 1/2010 | Chin .................. G06F 12/0866 711/E12.001 |
| 2013/0086309 A1 | 4/2013 | Lee et al. |
| 2014/0095769 A1 | 4/2014 | Borkenhagen |
| 2015/0169238 A1 | 6/2015 | Lee et al. |
| 2016/0188456 A1 | 6/2016 | Blagodurov |
| 2016/0253123 A1 | 9/2016 | Jacob |
| 2016/0378344 A1 | 12/2016 | Nachimuthu et al. |
| 2018/0059944 A1 | 3/2018 | Helmick et al. |
| 2018/0107406 A1 | 4/2018 | O et al. |
| 2019/0108145 A1 | 4/2019 | Raghava et al. |
| 2019/0172538 A1 | 6/2019 | Chinnaswamy et al. |
| 2019/0227709 A1 | 7/2019 | Butcher et al. |
| 2019/0317895 A1 | 10/2019 | Jung et al. |

OTHER PUBLICATIONS

USPTO, Notice of Allowance dated Mar. 1, 2021, in U.S. Appl. No. 16/994,233, 9 pgs.

* cited by examiner

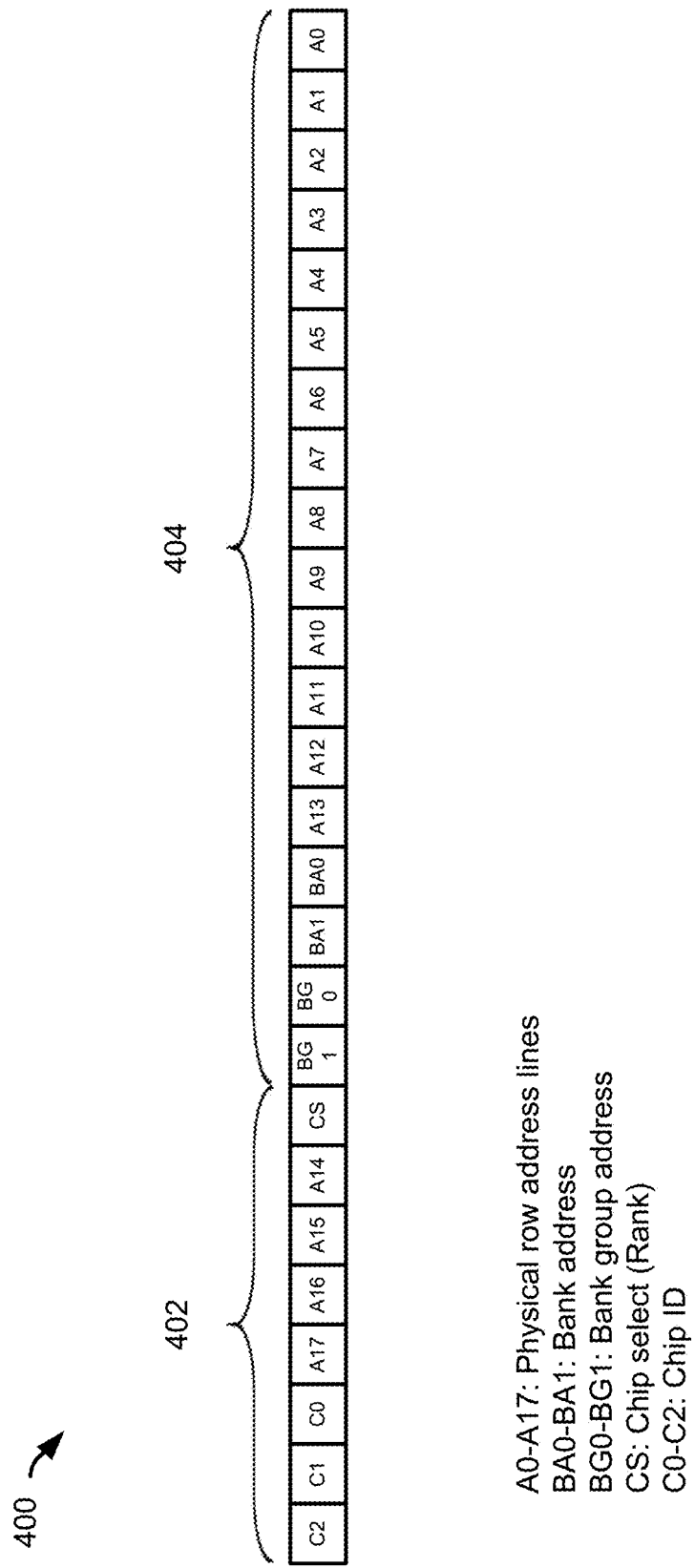

Note, example of 2 GB volatile memory and 512 GB memory module.

HYBRID MEMORY SYSTEMS WITH CACHE MANAGEMENT

CROSS REFERENCE TO RELATED APPLICATIONS

This application is a continuation-in-part of U.S. patent application Ser. No. 16/994,233, filed Aug. 14, 2020 and entitled "Hybrid Memory Systems with Cache Management," which claims priority to U.S. Provisional Application No. 62/889,001, filed Aug. 19, 2019 and entitled "Hybrid Memory with Cache Management." All of the above-referenced priority documents are hereby incorporated by reference.

BACKGROUND

The following description relates to hybrid memory systems with cache management.

A memory system can include memory modules which are physical storage devices that are capable of storing data and can be accessed by operating systems, software, and hardware. A memory system can also include a host memory controller which keeps track of status of memory location, organizes processes, and dedicates active processes to memory locations. Requirements of a memory system may be defined by demand of the application, operating systems, supporting software, and protocols.

DESCRIPTION OF DRAWINGS

FIG. 4 is a schematic diagram showing an example row address issued by the host memory controller.

DETAILED DESCRIPTION

Figure 1:
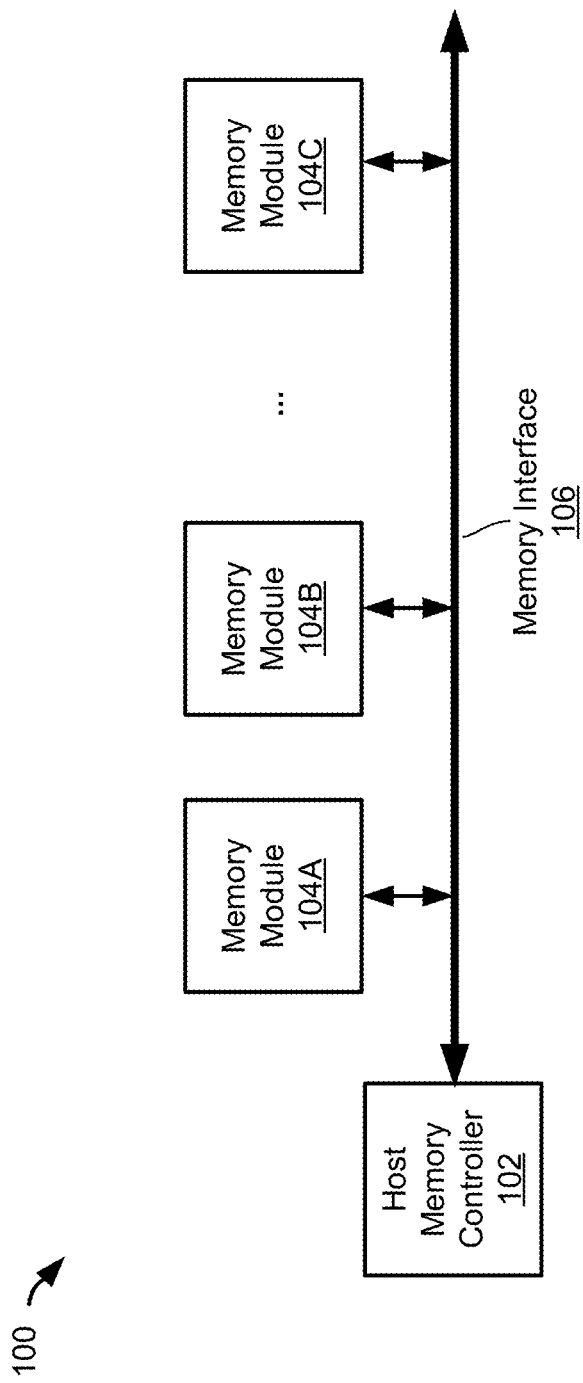
FIG. 1 is a block diagram showing aspects of an example memory system.

In some aspects of what is described, a memory access request is transmitted by operation of a host memory controller to a memory module via a memory interface. Whether to execute the memory access request is determined by operation of the memory module according to one or more specifications of the memory interface. In response to determining the memory access request cannot be executed according to the one or more specifications of the memory interface, the host memory controller is notified by the memory module and the host memory controller is halted. Respective actions are performed by operation of the memory module based on the memory access request and type of the memory module.

In some implementations, the systems and methods described here can be used to design a new generation of non-volatile random-access memory (NVRAM), which can be used as a synchronous dynamic NVRAM (SD NVRAM) to provide a high-speed memory access and a persistent memory capability. In some implementations, the systems and methods described here can provide technical advantages and improvements. For example, the systems and memory modules can be more efficient than existing NVRAM products and may be used to increase the efficiency of existing modern computer memory systems without requiring any hardware modification to the existing modern computer memory systems (e.g., DDR4/DDR5 standards). For another example, the systems and memory modules described here can store data in case of external power failure or a system reboot. Memory based on the systems and methods presented here can be allocated using an application based on a standard programing function (e.g., C/C++ malloc( )) and data stored in the memory can be retrieved after rebooting. The memory can be directly accessed by the application without using storage or file subsystems of the main computer system. Meanwhile, the application can have the capability to perform its processing and saving data simultaneously, without using the paging mechanism of the current computer memory management.

In some instances, hardware design according to the systems and methods described here can be implemented according to JEDEC JESD79-4 standard, which defines a specification of a DDR4 dual inline memory module (DIMM) and JEDEC79-5, which defines a specification of a DDR5 DIMM. The DIMM includes non-volatile memory (e.g., flash memory), and volatile memory (e.g., DRAM). The volatile memory is configured to work as a cache for the non-volatile memory. The size of the non-volatile memory would be matched with the size of the DIMM. For example, a 512 GB DIMM includes 512 GB of flash memory and 2 GB of DRAM. Commands for memory access requests are directly communicably transferred to or from the volatile memory. In cases where the requested data content does not exist in the volatile memory, the memory module is configured to perform internal data swapping between the volatile and the non-volatile memory. In some implementations, the systems and methods described here enable data swapping in memory modules. In this case, the processor may not consume its power to perform data swapping, thus improving the speed of the processor. During the internal data swapping process, memory modules can provide asynchronous communication to a host memory controller using a standard DDR4/DDR5 signal.

In some implementations, the systems and methods described here can be operated based on a cache management method optimized according to the DDR4/DDR5 standards. Generally, the standard can provide synchronous communication between DIMM modules and a host memory controller. In some instances, the cache management method presented here can provide asynchronous communication to the host memory controller, e.g., to halt the host memory controller and wait for the completion of the data swapping between the volatile memory and the non-volatile memory within the DIMM module. In some implementations, an existing DDR4 signal, e.g., an "ALERT_n" signal, can be used to establish the asynchronous communication between the volatile memory module and the host memory controller. In some instances, the "ALERT_n" signal is used to recalibrate the volatile memory in case of cyclic redundancy check (CRC) or parity errors. In some instances, the "ALERT_n" signal can be also used in data swapping between the volatile memory and the non-volatile memory.

In some implementations, the systems and methods described here can be used to design a new type of non-volatile dual in-line memory module (NVDIMM), which can be used in computing systems ranging from high-end servers to embedded telecommunication equipment. In some instances, the new type of NVDIMM according to the systems and methods described here can be used in applications, such as "in-memory" database, artificial intelligence (AI), virtualization, and another application, to provide high performance solutions.

In some implementations, the NVDIMM device according to the systems and methods described here is compatible with existing, without modification, DDR4/DDR5 interfaces. In some instances, the NVDIMM device includes two types of memory, e.g., a volatile memory which would be implemented as DRAM and a non-volatile memory which can be implemented as flash or another type of non-volatile memory. In some instances, the size of the volatile memory is less than or equal to the size of non-volatile memory of the NVDIMM device. In some instances, the volatile memory receives a memory access request working as a cache for the non-volatile memory. In some instances, the size of the NVDIMM device is equal to the size of the non-volatile memory. In certain instances, the sizes of the NVDIMM device, and its volatile and non-volatile memory, may comply with the DDR standards and can be scalable.

In some implementations, when the data content requested by the host memory controller in a memory access request is not present in the volatile memory (e.g., DRAM), the NVDIMM device can perform respective actions. In some instances, the respective actions include halting the host memory controller, performing data swapping between the volatile and the non-volatile memories of the NVDIMM device, and resuming respective DDR operations described in the memory access request after the data swapping is complete. In some implementations, a cache management controller is included in the NVDIMM device, which is configured to manage data swapping between the volatile and non-volatile memory. In some instances, the cache management controller is also configured to provide a paging mechanism. In certain examples, the paging mechanism provides page access to current data content stored in the volatile memory. In some implementations, the NVDIMM device may also include a power backup and an external I/O interface. In some instances, the power backup would provide power to move data from the volatile memory to the non-volatile memory of the NVDIMM device in case of power loss or system shutdown. In some instances, the external I/O interface is configured to provide additional communication to the NVDIMM device, including PCI, SCSI, network interfaces (e.g., Ethernet, or optical interface), or another interface technology.

In some implementations, the systems and methods described here can provide technical advantages and improvements. In some instances, the systems and methods described here provide a hybrid memory system with a combination of high-speed volatile memory and persisting memory. In some instances, when used in "in-memory" database applications, the system can run more efficiently and avoid traditional storage devices that have greater latencies. In some instances, systems and methods described here can reduce or even eliminate checkpoints during processes, such as machine learning/training process or another process. In this case, the systems and methods described here can efficiently protect data in a case of restarting its work by storing data in at least one type of memory. In some implementations, the systems and methods move data swapping inside a memory module, which can reduce processing power and can operate faster. In some implementations, the systems and methods described here are scalable, and the NVDIMM device constructed according to the systems and methods described here can provide byte-access and is compatible with the existing DDR4/DDR5 standards and may not require additional non-deterministic "READ"/ "WRITE" commands. In some cases, a combination of these and potentially other advantages and improvements may be obtained.

In some implementations, the systems and methods described here can be used in a Storage Class Memory (SCM) device in applications, such as processing unstructured data in big data, Internet of things (IoT), and in-memory databases, to provide new approaches to store or process data and to decrease latencies. In some instances, a hybrid memory design for SCM devices can be also cheaper than DRAM modules and faster than non-volatile memory modules. A central processor can recognize the device as part of the main memory and would execute its READ/ WRITE commands directly without any extra hardware or software support. The DIMM module based on the systems and methods presented here can be much cheaper than a regular DRAM DIMM with the same size. In addition, it would have persistent capabilities allowing a computer system to use memory as a SCM device avoiding the operation system storage stack and page management.

In some implementations, the systems and methods described here can be used in Processing-in-Memory (PIM)

devices, which are separated from the central processor, to provide an efficient method of communicating with a host memory controller. Generally, a processing unit of a PIM module reads data from volatile memory (e.g., DRAM cache) of the PIM module, performs requested computation, and stores results back into the volatile memory. In some instances, the methods described here can be used as an asynchronous communication method between a host memory controller and PIM modules.

In some aspects of what is described here, a memory module is a hybrid module including first volatile memory and non-volatile memory. The memory module also includes second volatile memory which can be implemented as an internal cache. In some instances, the volatile memory of the memory module is segmented into an external cache and an internal cache. In some instances, the internal cache includes two or more internal cache blocks with at least one reserved internal cache block. Each of the two or more internal cache blocks includes memory cache units for storing data received from the first volatile memory and the non-volatile memory. In some instances, the systems and methods described here allow optimized cache organization, enabling efficient memory access and data parallel processing. For example, data can be transferred out of an active internal cache block of the second volatile memory or into a reserved internal cache block of the second volatile memory in parallel. For another example, data can be transferred into/out of the volatile and non-volatile memory in parallel.

In some aspects of what is described here, a memory module is a hybrid module including volatile memory and non-volatile memory. In some implementations, the volatile memory of the memory module is segmented into an external cache and an internal cache. In some instances, the internal cache of the volatile memory includes two or more internal cache blocks with at least one reserved internal cache block. Each of the at least one internal cache blocks includes memory cache units for storing data received from the external cache of the volatile memory and the non-volatile memory. In this case, the systems and methods described here allow data to be transferred out of an active internal cache block of the internal cache of the volatile memory or into a reserved internal cache block of the internal cache of the volatile memory in parallel. For another example, data can be transferred into/out of the external cache of the volatile memory from/to the non-volatile memory via the internal cache of the volatile memory in parallel.

FIG. 1 is a block diagram showing aspects of an example memory system 100. The example memory system 100 may be used in computers, computing systems, and another type of system. The example memory system 100 shown in FIG. 1 includes a host memory controller 102, and multiple memory modules 104, e.g., memory modules 104A, 104B and 104C. The host memory controller 102 and each of the memory modules 104 communicate with each other via a memory interface 106. The example memory system 100 may include additional or different features, and the components of the example system may operate as described with respect to FIG. 1 or in another manner. For example, the example memory system 100 when used in computer systems may include memory channels, interconnect communication, non-uniform memory access (NUMA), and another component.

In some implementations, the host memory controller 102 is configured to manage data flow between a central processor and the memory modules 104. In some instances, the host memory controller 102 is configured to provide control signals and scheduled command sequences to the memory modules 104. The host memory controller 102 may include a digital circuit connected to or integrated with the central processor. The host memory controller 102 may vary according to the type of the memory module 104 and specifications of the memory interface 106. The host memory controller 102 may be implemented as the host memory controllers 804, 1302, 1400 shown in FIGS. 8, 13, and 14 or in another manner.

In some instances, the memory module 104 may be implemented as a dual in-line memory module (DIMM), a hybrid memory module, a process-in-memory (PIM) module, or as another type. In some instances, the memory module 104 may be implemented as the memory modules 200, 900, 1000 shown in FIGS. 2, 9 and 10, or in another manner. For example, the memory module 104 may include hybrid memory, e.g., a combination of volatile memory and non-volatile memory. For example, the memory module 104 may include a cache management controller, which can be implemented as the cache management controller 300 shown in FIG. 3 or in another manner.

In some implementations, the memory interface 106 defines a bus protocol for communication between the host memory controller 102 and the one or more memory modules 104. In some instances, the memory interface 106 may support different types of memory modules or different memory protocols. In some implementations, the memory interface 106 is a high-bandwidth interface that can be used to interface with memory modules 104 based on dynamic random-access memory (DRAM), or synchronous DRAM (SDRAM), for example, DDR4 SDRAM, DDR5 SDRAM, and DIMM DRAM. In the example memory system 100 shown in FIG. 1, the memory interface 106 is defined by one or more specifications, including latency, voltage level, temperature level, and data bus width. In some instances, the one or more specifications of the memory interface 106 may include another parameter for determining a protocol of communication. During operation, the host memory controller 102 may transfer a memory access request to one or more memory modules 104 via the memory interface 106.

Generally, a memory access request is a single action pursuant to a memory protocol. For example, a memory access request may be a "READ" request which involves fetching data content from one or more memory locations. For another example, a memory access request may be a "WRITE" request, which involves sending data content from a central processor to one or more memory locations. In some implementations, the memory access request may include a memory address and a request type (e.g., "READ", "WRITE", or "REFRESH"). The memory access request may further include data, for example, in a "WRITE" request.

The memory module 104, after receiving a memory access request from the host memory controller 102, can further determine whether the memory access request can be executed. To do this, the memory module 104 may use the one or more specifications of the memory interface 106 and the type of the memory module 104 to determine whether the memory access request can be executed. In certain examples, whether the memory access request can be executed or not may be determined using another parameter or in another manner.

In response to a determination that the memory access request can be executed, respective actions can be then performed by the memory module 104 according to the type of the memory module 104 and the memory access request. For example, the memory module 104 can perform a PIM operation when the memory module is a PIM module. In some implementations, after performing the respective actions, the memory module 104 can return the requested data content or results to the host memory controller 102 via the memory interface 106.

In response to a determination that the memory access request cannot be executed, the memory module 104 may transmit a signal via the memory interface 106 to the host memory controller 102, e.g., to halt the host memory controller until one or more actions are performed to prepare the memory module 104 for executing the memory access request. For example, the signal may be an asynchronous signal, e.g., a "NOT READY" or "ALERT_n" signal or in another format. For another example, when the memory module is a hybrid memory DIMM and when requested data content is not in a cache (e.g., volatile memory), a data swapping between the volatile memory and non-volatile memory, or another operation, can be performed to prepare the memory module for executing the memory access request. In some instances, the process described here can be implemented as the example processes 700, 740, 1200, 1230, and 1500 shown in FIGS. 7A, 7B, 12A, 12B and 15, or in another manner.

Figure 2:
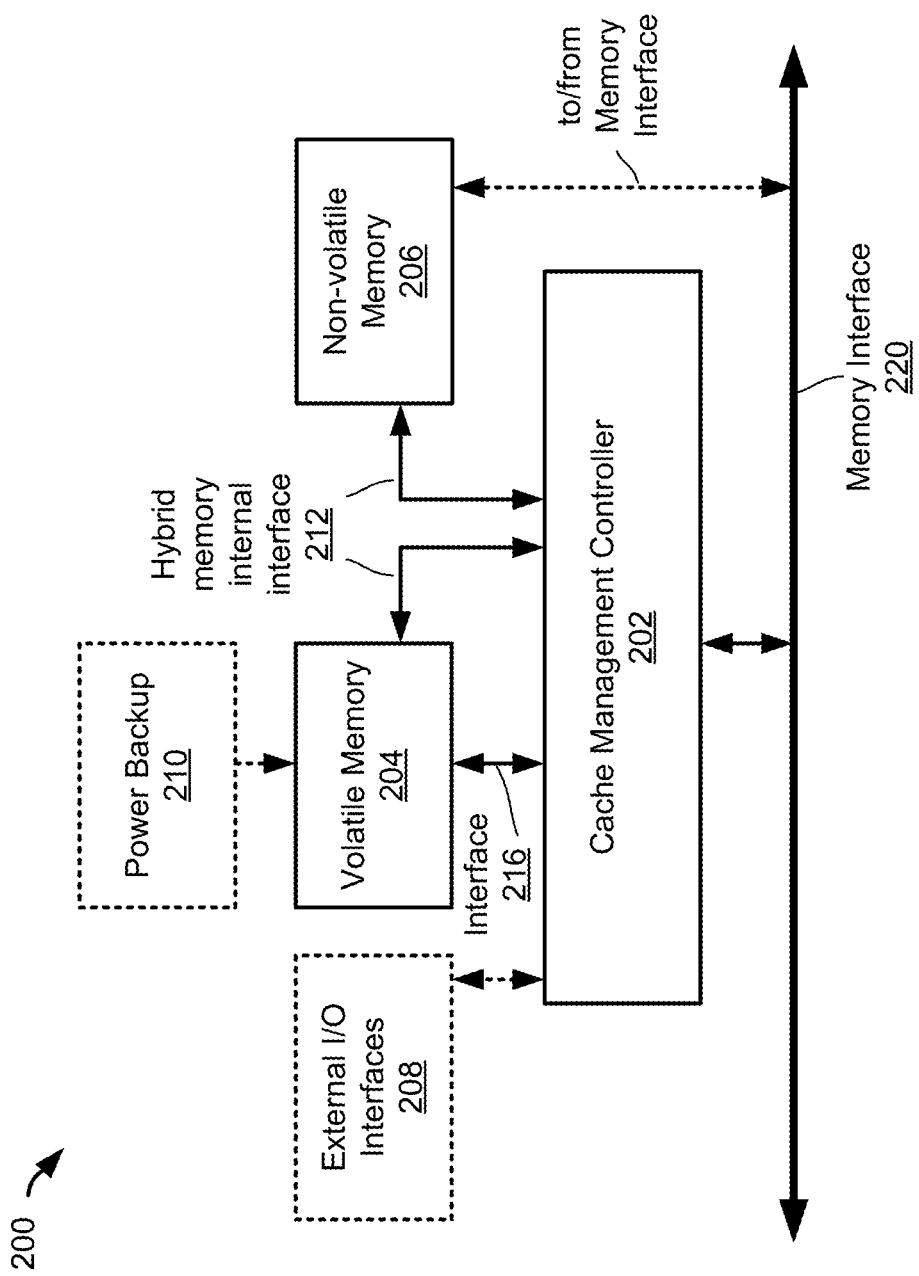
FIG. 2 is a block diagram showing aspects of an example memory module.

FIG. 2 is a block diagram showing aspects of an example memory module 200. The example memory module 200 may be used in a memory system, e.g., the memory systems 100, 800, and 1300 shown in FIGS. 1, 8 and 13, or in another system. The example memory module 200 shown in FIG. 2 is a hybrid memory module which includes a cache management controller 202, volatile memory 204, and non-volatile memory 206. As shown in FIG. 2, the memory module 200 is communicably coupled to a memory interface 220. which may be implemented as the memory interface 106 as shown in FIG. 1 or in another manner. In some implementations, the cache management controller 202 may be communicably coupled to the volatile memory 204 and the non-volatile memory 206 directly via respective hybrid memory internal interfaces 212. The example memory module 200 may include additional or different features, and the components of the example system may operate as described with respect to FIG. 2 or in another manner. For example, the example memory module 200 further includes an external input/output (I/O) interface 208 and a power backup 210. For another example, the non-volatile memory 206 may be directly accessible by the host memory controller 102 via the memory interface 220.

Figure 3:
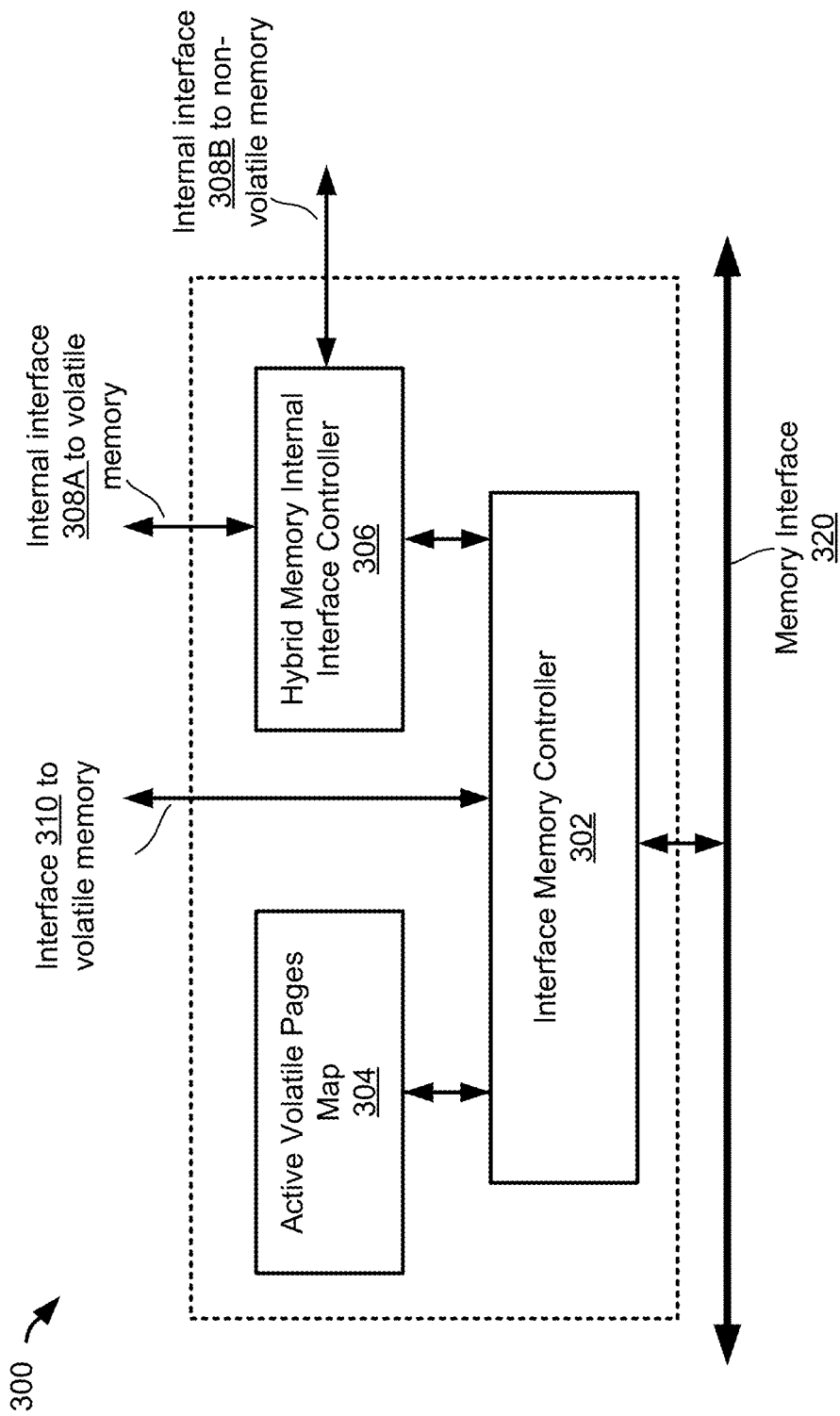
FIG. 3 is a block diagram showing aspects of an example cache management controller in a memory module.

In the example memory module 200 shown in FIG. 2, the cache management controller 202 is configured to perform operations such as, managing data flow between the volatile memory 204 and the non-volatile memory 206 via the hybrid memory internal interface 212, for example according to control signals received on the memory interface 220 (e.g., from the host memory controller 102). The cache management controller 202 is configured to provide mapping of the volatile memory 204 into memory requested by a host memory controller in a memory access request. In certain instances, the cache management controller 202 may be configured to perform another operation. The cache management controller 202 may be implemented as the cache management controller 300 as shown in FIG. 3 or in another manner.

As shown in the example memory module 200, the volatile memory 204 is directly connected to the cache management controller 202 via a memory interface to volatile memory 216 which is different from the hybrid memory internal interface 212 coupling between the volatile memory 204 and the cache management controller 202. The memory interface 216 can be the same as the memory interface 220. For example, when the requested data is in the cache, e.g., the volatile memory, the cache management controller 202 transfers signals from the memory interface 220 to the volatile memory via the memory interface to volatile memory 216.

In some implementations, the volatile memory 204 may be configured to store data content which is directly accessible by a host memory controller. For example, the data content can be received by the host memory controller from the volatile memory 204 or transmitted to the volatile memory 204 from the host memory controller. In some implementations, the volatile memory 204 may be implemented using random access memory (RAM), dynamic RAM (DRAM), synchronous DRAM (SDRAM), graphic double data rate (GDDR) SDRAM, embedded DRAM, or using another technology. In the example shown in FIG. 2, the non-volatile memory 206 contains persistent memory. For example, the non-volatile memory 206 may be implemented using flash memory, ferroelectric RAM (F-RAM), magneto-resistive RAM (M-RAM), spin-transfer torque RAM (STT-RAM), resistive RAM (R-RAM), ferroelectric field-effect transistor (Fe FET), or phase-change memory (PCM), or in another manner.

In the example memory module 200, the external I/O interface 208 is configured to provide interfaces for connecting and transferring data between the example memory module 200 and one or more external devices. In some instances, the external I/O interface 208 may include standard I/O buses, for example Peripheral Component Interconnect (PCI), Small Computer System Interface (SCSI), network interfaces (Ethernet, or optical), or another interface. In some examples, a network interface may be a network fabric and the memory module together with the network fabric may be implemented as a storage-over-fabric device to deliver high-speed and low-latency memory access. For example, an NVDIMM over fabric device can be implemented as NVDIMM over fiber channel, NVDIMM over remote direct memory access, and NVDIMM over TCP (transmission control protocol). In some examples the external I/O interface 208 is a PCIe (peripheral component interconnect express) interface which can be used to connect with conventional storage systems for debug capabilities.

In the example memory module 200, the power backup 210 provides backup power to the volatile memory 204, for example when moving data from the volatile memory to the non-volatile memory, in case of a power outage or a system failure in the example memory module 200. In some implementations, the power backup 210 may be implemented as a supercapacitor in addition to a main power to the example memory system 100, to deliver power to persist all data from a DRAM cache to flash memory when main power is lost.

During operation, the host memory controller may transmit a memory access request to the example memory module 200. When the requested data content is not available in the volatile memory 204, the cache management controller 202 of the example memory module 200 may perform data swapping, during which the requested data content according to the memory access request can be transferred from the non-volatile memory 206 to the volatile memory 204 of the memory module 200. In some implementations, the size of the requested data is equal to the size of the DRAM page size, e.g., column width×8 bits. In some implementations, the size of the volatile memory 204 is less than or equal to the size of non-volatile memory 206, which is advertised to the host memory controller 102.

FIG. 3 is a block diagram showing aspects of an example cache management controller 300 in a memory module. The example cache management controller 300 may be implemented as the cache management controllers 202, 1010 in the example memory modules 200 and 1000 shown in FIGS. 2 and 10, or in another manner. The example cache management controller 300 includes an interface memory controller 302, an active volatile pages map 304, and a hybrid memory internal interface controller 306. As shown, the interface memory controller 302 is communicably coupled to the active volatile pages map 304 and the hybrid memory internal interface controller 306. The interface memory controller 302 is communicably connected to a memory interface 320, which may be implemented as the memory interfaces 106 as shown in FIG. 1 or in another manner. The example cache management controller 300 may include additional or different features, and the components of the example controller may operate as described with respect to FIG. 3 or in another manner.

As shown in the example cache management controller 300, the interface memory controller 302 is configured to provide communications with a host memory controller (e.g., the host memory controller 102 in FIG. 1) via the memory interface 320 and to manage DDR operations. In some instances, the interface memory controller 302 is configured to decode a row address issued by the host memory controller (e.g., a structure of an example row address issued by the host memory controller 400 is shown in FIG. 4) received from the host memory controller in a memory access request. The interface memory controller 302 is configured to further transfer the row address issued by the host memory controller to the active volatile pages map 304. In some implementations, the hybrid memory internal interface controller 306 is configured to manage the data swapping between the volatile memory and the non-volatile memory (e.g., the volatile memory 204 and the non-volatile memory 206) initiated by the interface memory controller 302 or in another manner. In some instances, the hybrid memory internal interface controller 306 is communicably coupled to the volatile memory and the non-volatile memory using respective internal interfaces 308A, 308B. In some instances, the interface 310 to the volatile memory may be implemented as the interface 216 of the memory module 200 or in another manner.

FIG. 4 is a schematic diagram showing an example row address 400. The example row address 400 shown in FIG. 4 can be translated according to a system physical address and issued by a host memory controller. The example row address 400 shown in FIG. 4 includes two parts, e.g., a high part 402 and a low part 404. The low part 404 of the row address 400 is used to address a row in a volatile memory of a memory module (e.g., the volatile memory 204 in the memory module 200). In certain implementations, the high part 402 of the row address 400 may be used to define if data in the row is in the volatile memory. As shown in FIG. 4, the low part 404 of the row address 400 contains 18 bits, including 14 bits for physical row addresses (e.g., A0-A13), 2 bits for bank addresses (e.g., BA0 and BA1), and 2 bits for bank group addresses (e.g., BG0 and BG1). The high part 402 of the row address 400 contains 8 bits including 3 bits for chip ID (e.g., C0-C2), 1 bit for chip select (e.g., CS), and 4 bits for the rest of the physical row address lines (e.g., A14-A17). The example row address 400 shown in FIG. 4 is used in a memory module of total memory size of 512 GB with volatile memory of 2 GB. In some implementations, the row address may include a different number of bits according to the memory sizes of the memory module and the volatile memory. In certain implementations, the row address may be implemented in another manner.

In some implementations, each address in the active volatile pages map 304 contains information about the higher part 402 of a memory page, where data is stored in the volatile memory. The lower part 404 of the row address 400 and data stored in an address defined by the lower part 404 of the row address 400 form the row address 400.

In some implementations, the active volatile pages map 304 may be implemented as very fast volatile memory with a low latency, for example as SRAM, or as another type. In some instances, the active volatile pages map 304 is configured to store the information about active pages of the volatile memory. In certain instances, an active page is a memory page in which data is kept in the volatile memory. In some implementations, the size of the active volatile pages map 304 is determined according to the width of the row address. The low part 404 may address volatile memory of 2 GB in a memory module of 512 GB. The size of the active volatile pages map is equal to $2^N$, where N is a number of bits (signal lines) in the low part 404. In the example row address 400 shown in FIG. 4, the low part 404 contains 18 signals which could address the active volatile pages map of 256 KB. In some implementations, the size of the active volatile pages map 304 may have a different value and may be determined in another manner.

Figure 5A:
FIG. 5A is a schematic diagram showing an example row address of volatile memory in a memory module.
Figure 5B:
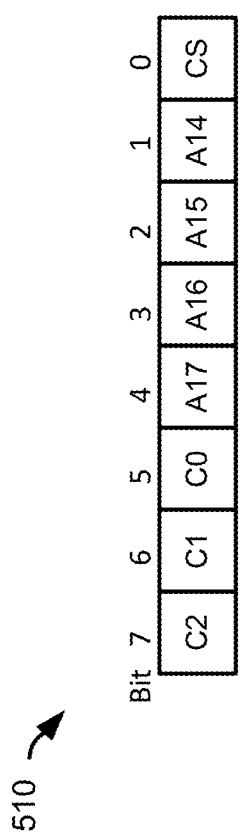
FIG. 5B is a schematic diagram showing an example address in an active volatile pages map in a cache management controller.

FIG. 5A is a schematic diagram showing an example row address of volatile memory in a memory module. In the example row address 500, N is a maximum number of row addresses of the volatile memory, which is equal to the number of bits (signal lines) in a low part of a row address, e.g., the low part 404 of the row address 400. FIG. 5B is a schematic diagram showing an example address 510 in an active volatile pages map in a cache management controller. The high part of a row address is stored at the address of the active volatile pages map. Therefore, each address in the active volatile pages map can store information of a memory page that is currently in the volatile memory. In the example shown in FIG. 5B, the volatile memory has a size of 2 GB.

Figure 6:
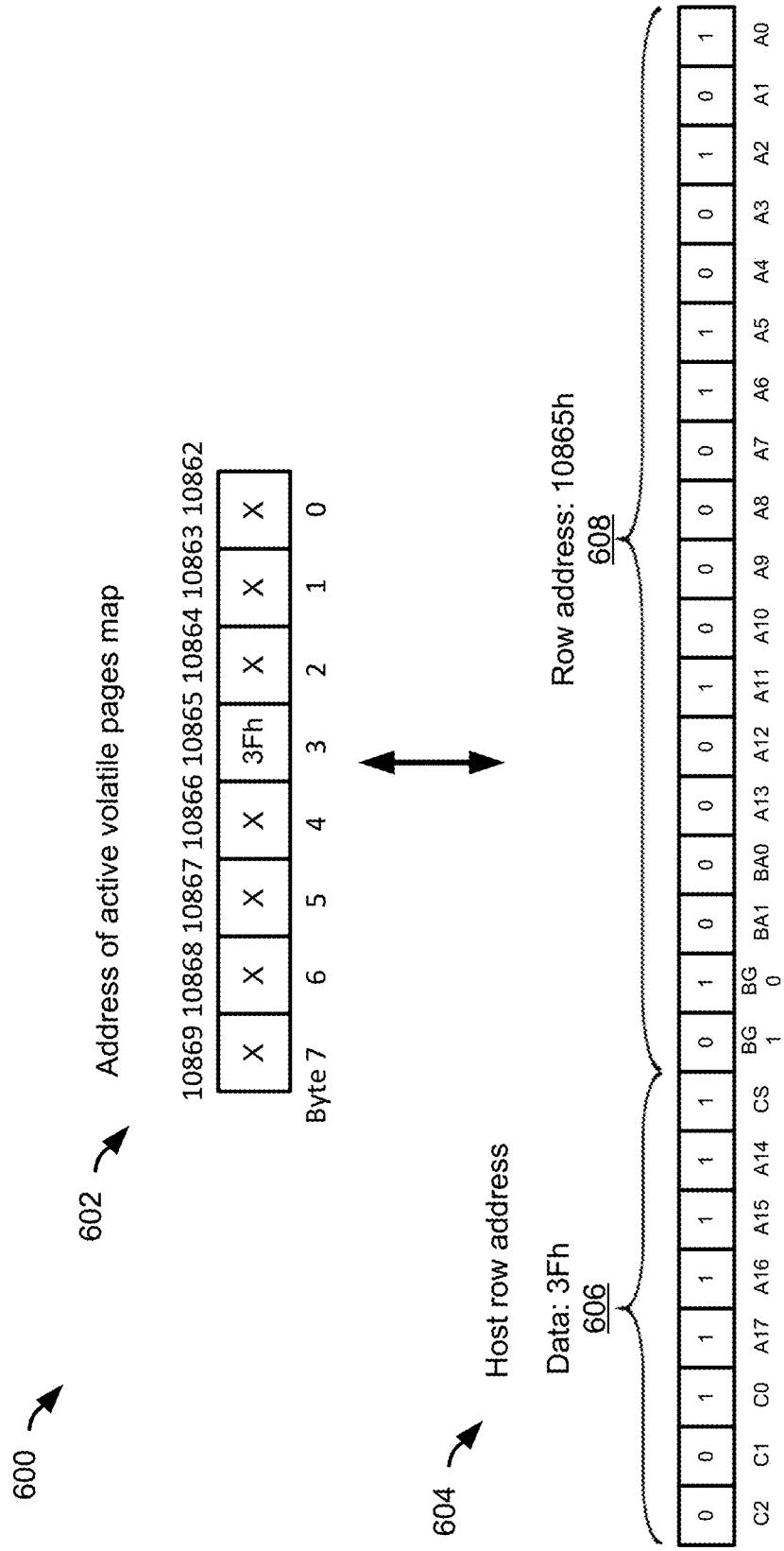
FIG. 6 is a schematic diagram showing an example process.

FIG. 6 is a schematic diagram showing an example process 600. The example process 600 can be used to assemble an example row address 604 based on an example address 602 in an active volatile pages map (e.g., the active volatile pages map 304). For example, during data swapping, a row address assembled based on an address in an active volatile pages map can be used to determine a starting address of a memory page in non-volatile memory for storing current data content in volatile memory. The example process 600 can be also used to create the address 602 in the active volatile pages map based on the row address 604. For example, when requested data content is not stored in volatile memory and after data swapping is complete, an address of the active volatile pages map can be updated according to a row address.

Generally, an address 602 of an active volatile pages map includes a starting address of a memory page in volatile memory and data content stored at the starting address of the memory page in the volatile memory of a memory module. A row address 604 can be included in a memory access request transmitted by a host memory controller to a memory module via a memory interface. The row address 604 is split into two parts: a high part 606 representing data content stored at a starting address of the memory page and a low part 608 corresponding to the starting address of the memory page. The high and low parts 606, 608 together in the row address 604 specify a starting address of a memory page in non-volatile memory of the memory module.

In the example process 600, the example address 602 of the active volatile pages map equals a starting address of a memory page in volatile memory. Data content stored at the starting address (e.g., 10865h) is 3Fh, representing the higher part of the starting address of the row in non-volatile memory. The example address 602 of the active volatile pages map (e.g., 10865h) is used to determine the low part 608 of the row address 604, e.g., 010000100001100101, which contains 18 bits, and the byte stored at the starting address (e.g., 3Fh) is used to determine the high part 606 of the example row address 604, e.g., 00111111, which contains 8 bits. In some implementations, the address of the active volatile pages map and the row address may have different sizes (e.g., contain different numbers of bits) or may be configured in another manner, which may be determined according to sizes of volatile memory and non-volatile memory in a memory module, one or more specifications of the memory interface, or may be determined in another manner.

Figure 7A:
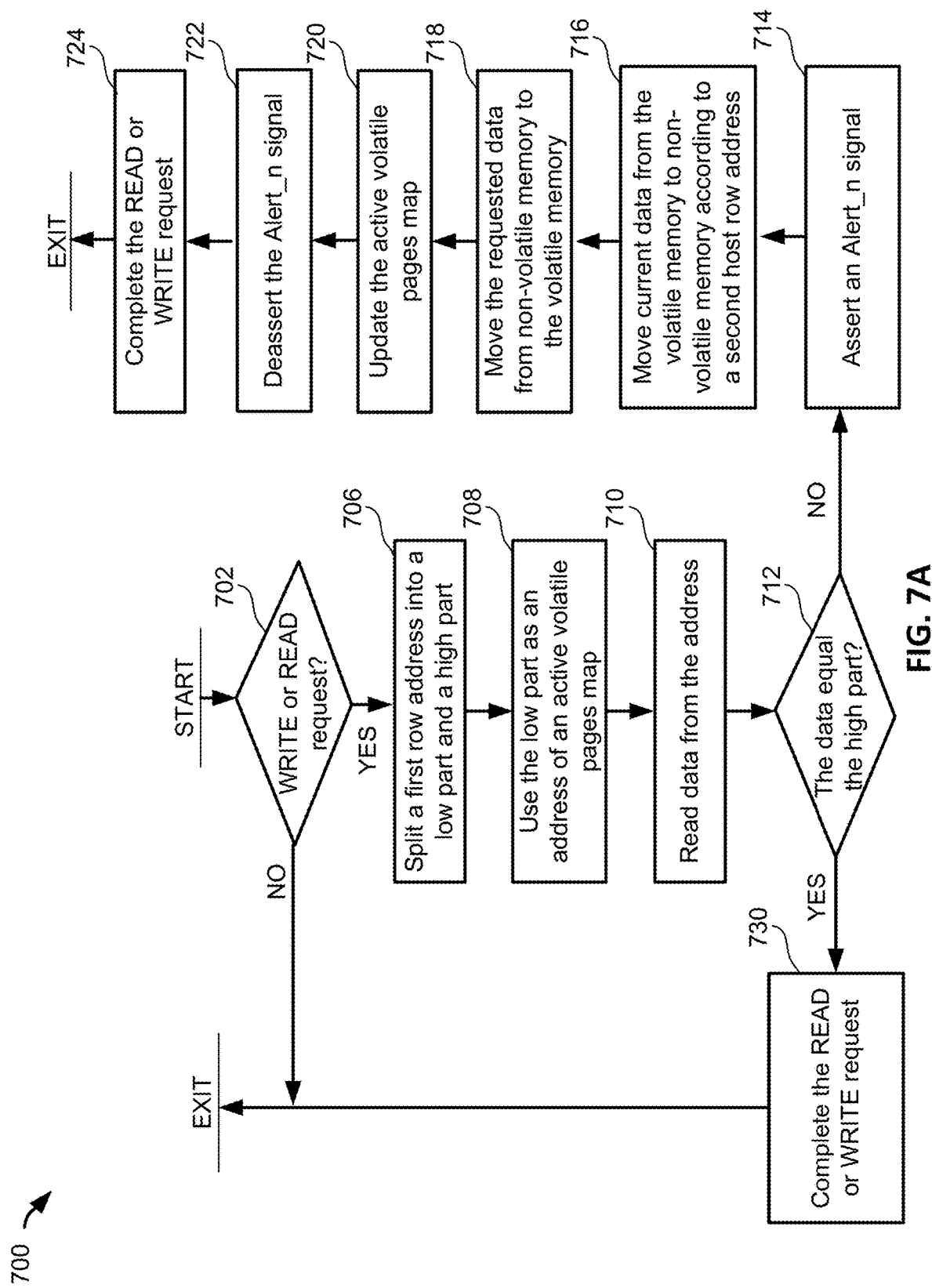
FIG. 7A is a flow diagram showing aspects of an example process.

FIG. 7A is a flow diagram showing aspects of an example process 700. The example process 700 may be implemented in a memory system for cache management when performing a memory access request (e.g., performing "READ" or "WRITE" requests). In some instances, the memory system may be implemented as the memory system 100 shown in FIG. 1 or in another manner. In certain examples, aspects of the example process 700 may be performed by a cache management controller of a memory module, e.g., the cache management controllers 202 in the memory module 200 as shown in FIG. 2. In some instances, the memory module may include volatile memory and non-volatile memory. In some instances, the cache management controller may include an interface memory controller, an active volatile pages map, and a hybrid memory internal interface controller, which may be implemented as the respective components shown in the example cache management controller 300 of FIG. 3 or in another manner. The example process 700 may include additional or different operations, and the operations may be performed in the order shown or in another order. In some cases, operations in the example process 700 can be combined, iterated or otherwise repeated or performed in another manner.

At 702, whether a memory access request is a "READ" or "WRITE" request is determined. In some implementations, a memory module may receive the memory access request from a host memory controller via a memory interface (e.g., the memory interfaces 106). In some instances, a type of the memory access request may be determined according to a request type in the memory access request or in another manner. In response to the memory access request is determined as neither a "READ" request nor a "WRITE" request, the process 700 is terminated.

In response to the memory access request being either a "READ" request or a "WRITE" request, the process 700 continues with operation 706, in which a first row address included in the memory access request received via the memory interface is split into two parts, e.g., a first low part and a first high part. In some instances, the first row address is split by the cache management controller of the memory module according to the total memory size of the memory module and the size of the volatile memory of the memory module. In certain instances, the first row address may be split considering another parameter or in another manner.

At 708, the first low part of the first row address is used as an address of an active volatile pages map. The address of the active volatile pages map indicates a starting address of a memory page where the requested data content is stored in the volatile memory. The process 700 further continues with operation 710 in which current data content at the address of the active volatile pages map is read by the cache management controller from the active volatile pages map.

At 712, the current data content stored at the address of the active volatile pages map is compared with requested data content indicated by the first high part of the first row address. In some implementations, the comparison is performed by the interface memory controller of the cache management controller, or in another manner. In response to the first high part being equals to the current data content at the address of the active volatile pages map, the process 700 continues with operation 730 in which the memory access request is complete. For example, the requested data content can be read from or written to the volatile memory according to the first low part of the first row address to complete the memory access request. In some implementations, the total time that is needed to complete operations 704-712 is a cache data detection time, which is no greater than a Row Address Strobe (RAS) delay. Therefore, the cache management method described here can provide cache data detection without violating DDR latencies.

In response to a determination that the current data content at the address of the active volatile pages map is different from the first high part of the first row address during operation 712, the process 700 continues with operation 714, in which an "ALERT_n" signal is asserted. In some instances, the asynchronous signal is a "NOT READY" signal or in another format. The asynchronous signal is asserted by the memory module to the host memory controller via the memory interface, indicating a delay in operations to complete the memory access request. In some instances, the asynchronous signal may remain active until respective actions, e.g., data swapping between the volatile memory and the non-volatile memory to prepare the requested data content, is complete. In some implementations, latency for the asynchronous signal is much less than the time that non-volatile memory requires to complete its operations during the data swapping. For example, a typical latency for the "ALERT_n" signal is in a range of 10-200 nanoseconds (ns) and a typical non-volatile memory operation using flash may take a time period of microseconds. In some cases, the asynchronous signal may be asserted multiple times for the same address. In certain cases, the latency of the asynchronous signal can be increased to a value during which the data swapping, for example the operations by the non-volatile memory, can be completed. In some instances, the latency of the asynchronous signal can be increased by modifying the host memory controller, such as adding extra functionalities to UEFI (Unified Extensible Firmware Interface) or BIOS (Basic Input/Output System) modules, or in another manner.

At 716, the current data content is transferred from the volatile memory to the non-volatile memory according to a second row address. The current data content stored in the volatile memory, which is different from the requested data content, e.g., specified by the first high part of the first row address in the memory access request, can be transferred out of the volatile memory, and stored in the non-volatile memory. A starting address of the non-volatile memory is determined by the second row address. The second row address is assembled by combining the first low part of the first row address and a second high part which is determined by the current data content at the address of the active volatile pages map. An example process to assemble the second row address using the address of the active volatile pages map and the data stored at the address is illustrated in FIG. 6.

At 718, the requested data content is further transferred from the non-volatile memory to the volatile memory. In some instances, the requested data content is transferred from a memory page in the non-volatile memory to a memory page in the volatile memory. In some instances, a starting address of the memory page in the volatile memory for storing the requested data content is determined by the first low part of the first host memory address. In some instances, a starting address of the memory page in the non-volatile memory is determined by the first row address.

At 720, the active volatile pages map is updated. In some instances, the active volatile pages map is updated according to the requested data content at the starting address of the memory page in the non-volatile memory addressed by the first row address. In this case, the data swapping, e.g., transferring the current data content out of the volatile memory to the non-volatile memory and the requested data content from the non-volatile memory to the volatile memory, is complete by the interface memory controller via the hybrid memory internal interface controller.

At 722, the "ALERT_n" signal is deasserted. In some instances, the "ALERT_n" signal is deasserted by the interface memory controller or in another manner. At 724, the "READ" or "WRITE" request is complete by operation of both the memory module and the host memory controller. For example, in response to a "READ" request, the requested data content from the volatile memory is read to the host memory controller. For another example, in response to a "Write" request, the requested data content from the host memory controller is written to the volatile memory of the memory module. In some implementations, the host memory controller can either issue a new operation using the same first row address or resume a postponed operation.

In some implementations, the asynchronous signal "NOT READY" can be implemented using an "ALERT_n" signal according to a DDR4/DDR5 standard. Generally, the "ALERT_n" is a signal which is used in the case of an error (e.g., CRC or Command and Address Parity check) during a DDR operation. During data swapping between the volatile memory and the non-volatile memory, which takes more time than any DDR operation, the memory module can emulate an error, e.g., Parity Address error, thus activating the "ALERT_n" signal. Because a maximum active time of the "ALERT_n" signal according to DDR4 specification is much smaller than a minimal time of any non-volatile memory operation, the memory module, in some instances, can reissue the "ALERT_n" signal until respective actions, for example the data swapping between the volatile memory and the non-volatile memory, is complete.

In some implementations, the volatile memory could be flushed to the non-volatile memory during system shutdown, loss of power, or even during normal system operation. Methods of flushing include, but are not limited to, issuing special DDR commands, using a back-up channel, using SAVE signal in a NVDIMM-N standard, or using NVDIMM-P FLUSH command. In some instances, the SAVE signal can be used to instruct a memory module to save data content in the volatile memory to the non-volatile memory.

Figure 7B:
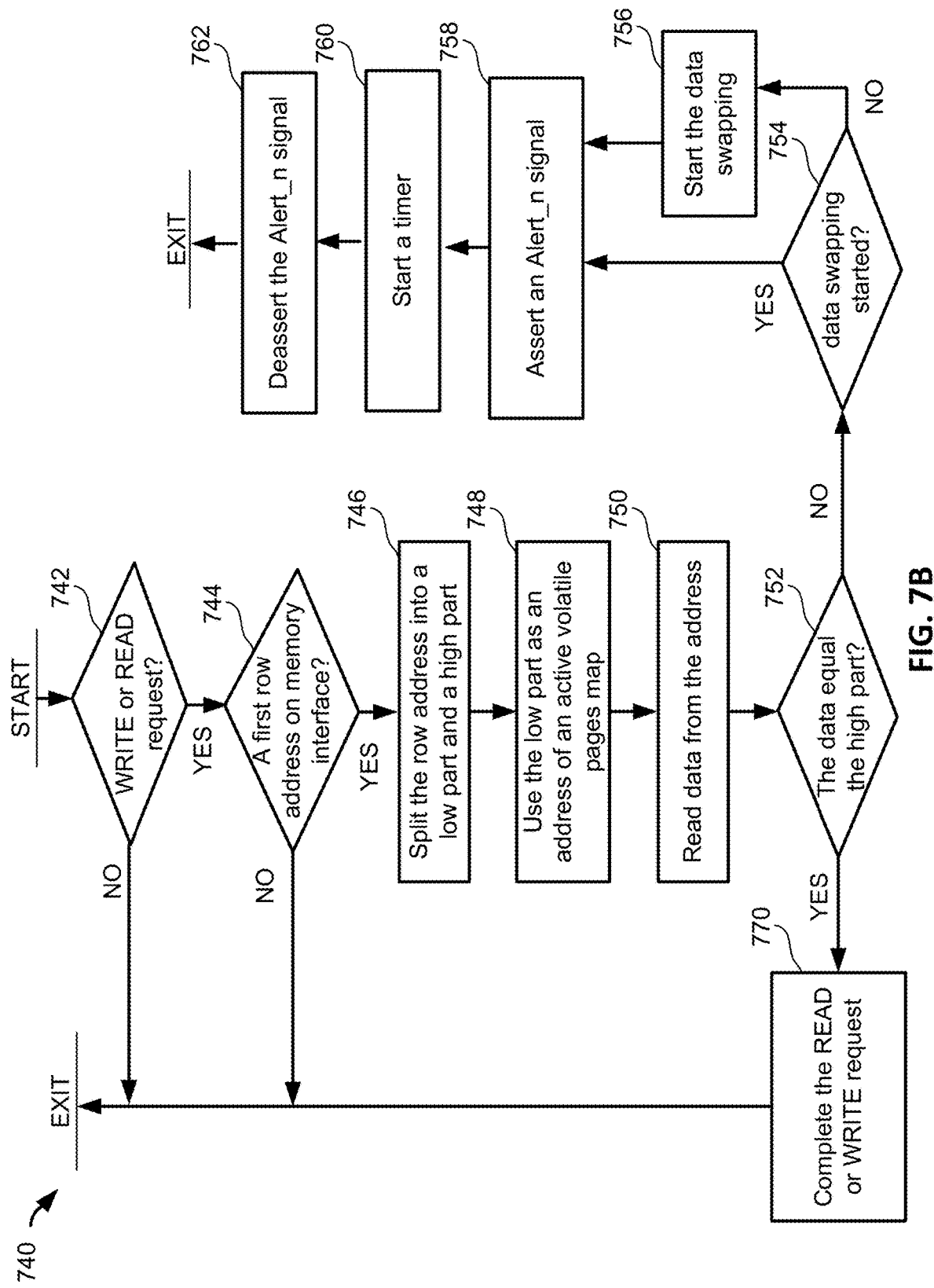
FIG. 7B is a flow diagram showing aspects of an example process.

FIG. 7B is a flow diagram showing aspects of an example process 740. The example process 740 may be implemented in a memory system for cache management when performing a memory access request (e.g., performing "READ" or "WRITE" requests). In some instances, the memory system may be implemented as the memory system 1300 shown in FIG. 13 or in another manner. In some instances, the memory system includes a host memory controller with queued management and one or more memory modules. In some instances, the memory module may include volatile memory, non-volatile memory, and a cache management controller. In some instances, the cache management controller may include an interface memory controller, an active volatile pages map and a hybrid memory internal interface controller, which may be implemented as the respective components shown in the example cache management controller 300 of FIG. 3 or in another manner. The example process 740 may include additional or different operations, and the operations may be performed in the order shown or in another order. In some cases, operations in the example process 740 can be combined, iterated or otherwise repeated, or performed in another manner.

Operations 742, 744, 746, 748, 750, 752, and 770 in the process 740 may be respectively implemented as the operations 702, 704, 706, 708, 710, 712, and 730 in the process 700 shown in FIG. 7A or in another manner.

In response to a determination that the current data content at the address of the active volatile pages map is different from the first high part of the first row address during operation 752, the process 740 continues with operation 754, in which whether a data swapping process is started or not is determined. In some implementations, the data swapping process is performed in the memory module between the volatile memory and the non-volatile memory. For example, the data swapping process can be implemented as the operations 716, 718, and 720 during the example process 700 or in another manner. In response to a determination that the data swapping process has started, the process 740 continues with operation 758, in which an "ALERT_n" signal is asserted. In response to a determination that the data swapping process has not started, the process 740 continues with the operation 756, in which the data swapping process is started. The process 740 continues with the operation 758, in which an "ALERT_n" signal is asserted. In some instances, the "ALERT_n" signal can be asserted by the memory module to the host memory controller to halt operations of the host memory controller. At 760, a timer is started subsequently to or simultaneously with the asserted "ALERT_n" signal. In some instances, the timer can be preconfigured, or programmed according to specifications of the memory system, or determined in another manner. At 762, the "ALERT_n" signal is de-asserted. In some instances, the "ALERT_n" signal can be de-asserted by the memory module to the host memory controller after the timer is terminated. After the "ALERT_n" signal is de-asserted, the process 740 is terminated.

Figure 8:
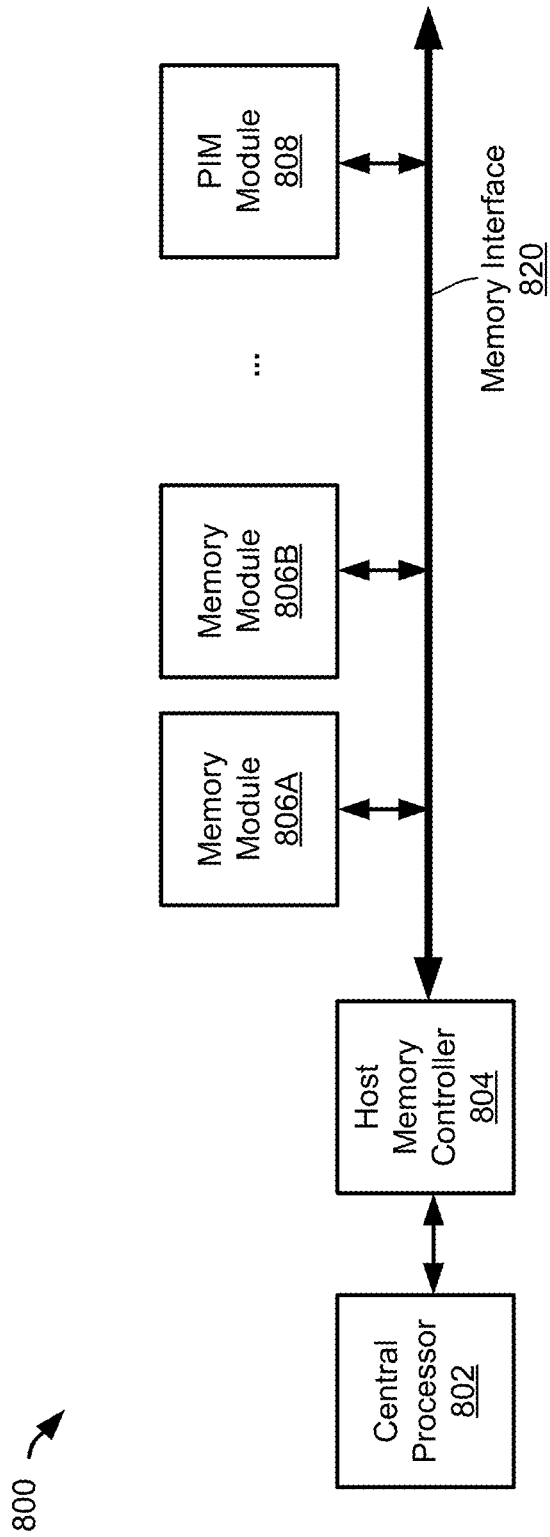
FIG. 8 is a schematic diagram showing aspects of an example computing system.

FIG. 8 is a schematic diagram showing aspects of an example computing system 800. The example computing system 800 shown in FIG. 8 includes a central processor 802, a host memory controller 804, and one or more memory modules 806. The host memory controller 804 is communicably coupled to each of the one or more memory modules 806 via a memory interface 820. In some instances, one or more of the memory modules 806 may be implemented as a DIMM, or another module. As shown in FIG. 8, the example computing system 800 also includes a Processing-in-Memory (PIM) module 808 which is communicably coupled to the host memory controller 804 via the memory interface 820. In some implementations, the example computing system 800 may also include additional or different features (e.g., regular memory modules, and standard bus), and the components of the example computing system 800 may operate as described with respect to FIG. 8 or in another manner.

The example computing system 800 may include a memory system, e.g., the memory system 100 shown in FIG. 1. In some instances, the host memory controller 804, the memory modules 806, and the memory interface 820 may be implemented as the respective components as shown in FIG. 1, or in another manner.

In some implementations, the central processor 802 is a data-processing apparatus that can execute instructions, for example, generating output data based on data inputs. For example, the central processor 802 may run computer programs by executing or interpreting the software, scripts, programs, functions, executables, or other modules stored in the memory modules 806. In some implementations, the central processor 802 may be implemented as a general-purpose processor, a content addressable memory, a digital signal processor, an application specific integrated circuit, a field programmable gate array, any suitable programmable logic device, discrete gate or transistor logic, discrete hardware components, or any combination thereof. In some instances, the central processor 802 may be realized as a microprocessor, a controller, a microcontroller, a state machine, or another type. In some implementations, the central processor 802 can include one or more chips or chipsets that include analog circuitry, digital circuitry, or a combination thereof. In some cases, the central processor 802 includes multiple processor devices such as, for example, one or more main processors and one or more co-processors. For instance, the central processor 802 may include a main processor that can delegate certain computational tasks to a co-processor, which may be configured to perform the computational tasks more efficiently than the main processor or in parallel with other computational tasks performed by other processor devices (e.g., a processing unit of the PIM module 808). In some instances, the central processor 802 coordinates vectors or controls operation of other components such as, for example, user interfaces, communication interfaces, peripheral devices, and possibly other components.

In some implementations, the PIM module 808 is configured to process data within a memory module. In some instances, the PIM module 808 is efficient since it does not involve sending data to the central processor for processing and receiving the processed data back from the central processor. In some implementations, the PIM module 808 can reduce power of running systems such as mobile devices, embedded devices, or another device. In some implementations, the PIM module 808 may include a processing unit, volatile memory, and a PIM memory control unit. In certain instances, the PIM module 808 can be implemented as the PIM modules 900, 1000 shown in FIGS. 9 and 10, or in another manner.

In some implementations, operations performed by the central processor 802 and the PIM module 808 can be synchronized, e.g., using asynchronous signals. For example, an asynchronous signal, such as a "NOT READY" signal, can be used as a signal to synchronize the operations performed by the central processor 802 and the PIM module 808. In some implementations, the central processor 802 writes original data in a first memory region and reads results from a second memory region. In some instances, the first memory region and the second memory region are the same. As soon as the central processor 802 executes the "READ" command, the PIM module 808 asserts a "NOT READY" signal to halt the operation on the host memory controller 804. After completing respective actions, e.g., finishing requested computation, within the PIM module 808, the PIM module 808 writes result data in the second memory region and de-asserts the "NOT READY" signal. After the "NOT READY" signal is de-asserted, the host memory controller 804 completes the "READ" operation and the central processor 802 receives the result data back from the host memory controller 804.

Figure 9:
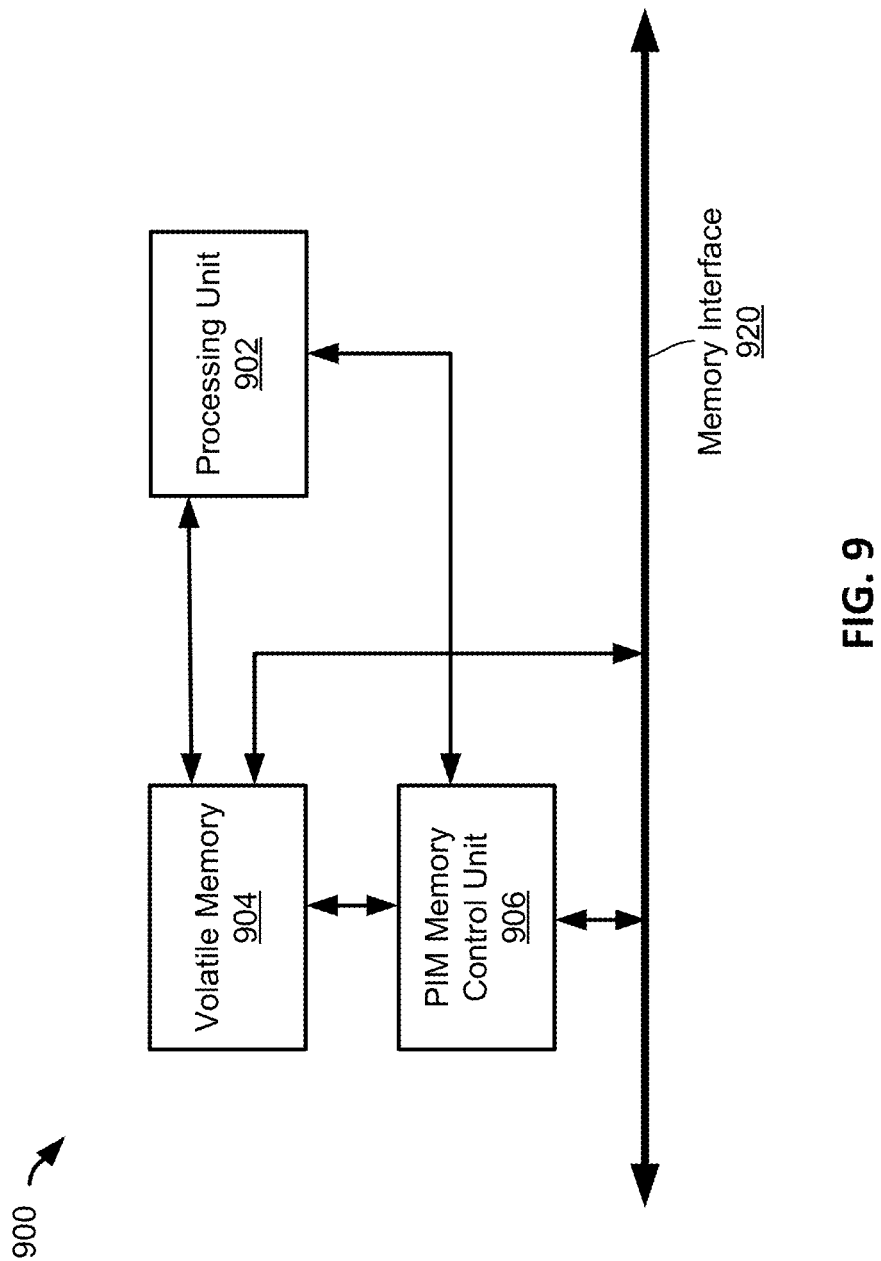
FIG. 9 is a schematic diagram showing aspects of an example PIM module.

FIG. 9 is a schematic diagram showing aspects of an example PIM module 900. In some instances, the example PIM module 900 can be implemented as the PIM module 808 of the example memory system 800 shown in FIG. 8. The example PIM module 900 includes a processing unit 902, volatile memory 904, and a PIM memory control unit 906. The example PIM module 900 may include additional or different features, and the components of the example device may operate as described with respect to FIG. 9 or in another manner.

In some instances, the processing unit 902 may be configured to provide functions such as computation within the PIM module. The processing unit 902 may be implemented as a logical device, for example a complementary metal oxide semiconductor (CMOS) device, a field programmable gate array (FPGA), a complex programmable logic device (CPLD), an application-specific integrated circuit (ASIC), or another device. In the example shown in FIG. 9, access to the PIM module 900 is provided by the memory interface 920 according to specifications or protocols, such as DDR4 or newer, or through another RAM access interface. The volatile memory 904 may be implemented as the volatile memory 204 of the memory module 200 in FIG. 2 or in another manner.

In the example PIM module 900, the PIM memory control unit 906 is configured to provide a memory interface to the volatile memory 904, to manage operations performed by the processing unit 902. In some implementations, the PIM memory control unit 906 may be configured to perform another function. In certain instances, the PIM memory control unit 906 may be implemented as the PIM memory control unit 1100 as shown in FIG. 11 or in another manner.

Figure 10:
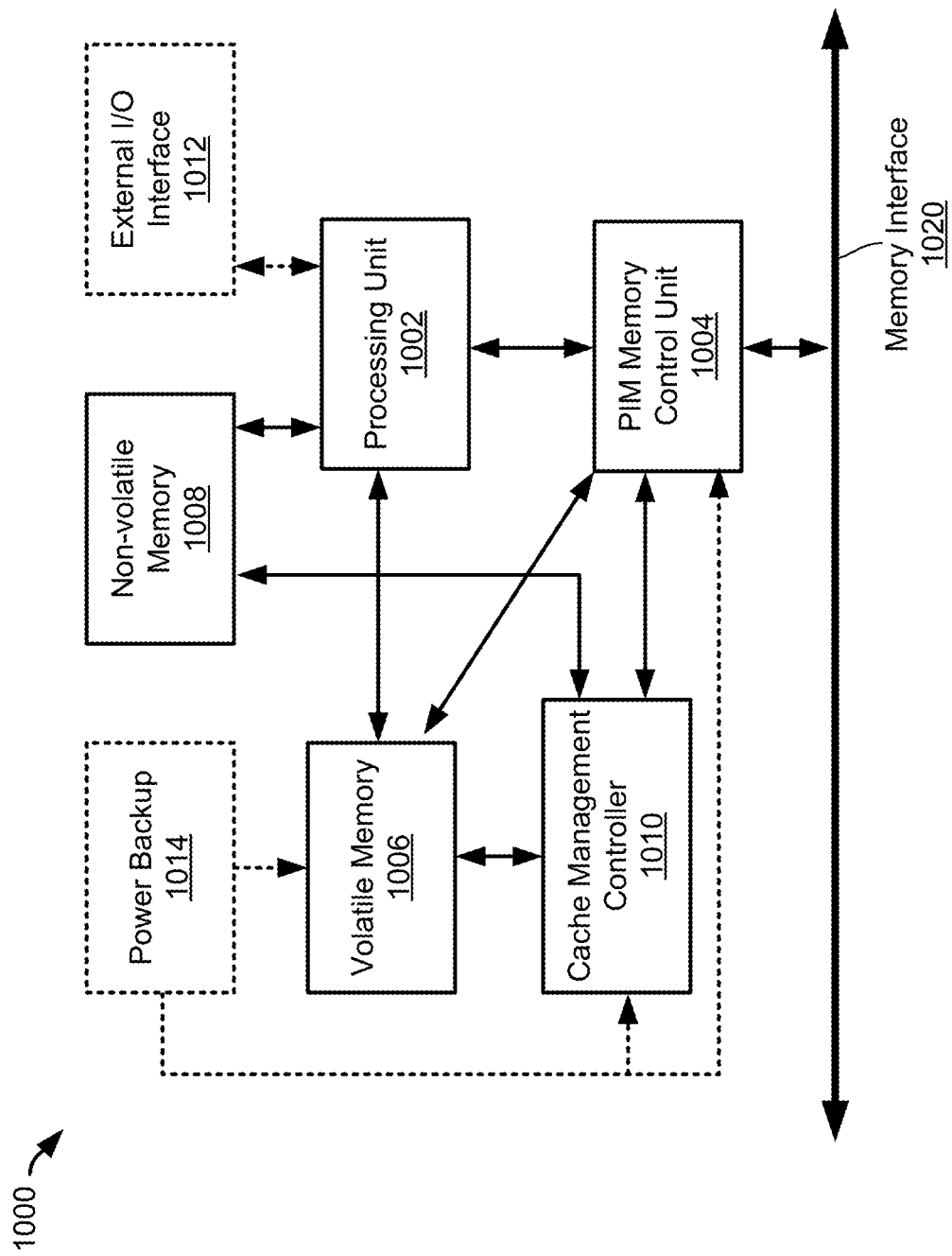
FIG. 10 is a schematic diagram showing aspects of an example PIM module.

FIG. 10 is a schematic diagram showing aspects of an example PIM module 1000. In some instances, the example PIM module 1000 can be implemented as the PIM module 808 of the example memory system 800 shown in FIG. 8 or in another manner. The example PIM module 1000 is implemented as a hybrid memory module which includes volatile memory 1006, non-volatile memory 1008, a cache management controller 1010, an external I/O interface 1012, and a power back up 1014. In some instances, the volatile memory 1006, the non-volatile memory 1008, the cache management controller 1010, the external I/O interface 1012, and the power backup 1014 may be implemented as the respective components in the memory module 200. The example PIM module 1000 further includes a processing unit 1002, and a PIM memory control unit 1004, which may be implemented as the respective components in the PIM module 900 shown in FIG. 9. As shown in FIG. 10, the PIM memory control unit 1004 is communicably coupled to the memory interface 1020 so as to provide the memory interface to the cache management controller 1010. The example PIM module 1000 may include additional or different features, and the components of the example device may operate as described with respect to FIG. 10 or in another manner.

Figure 11:
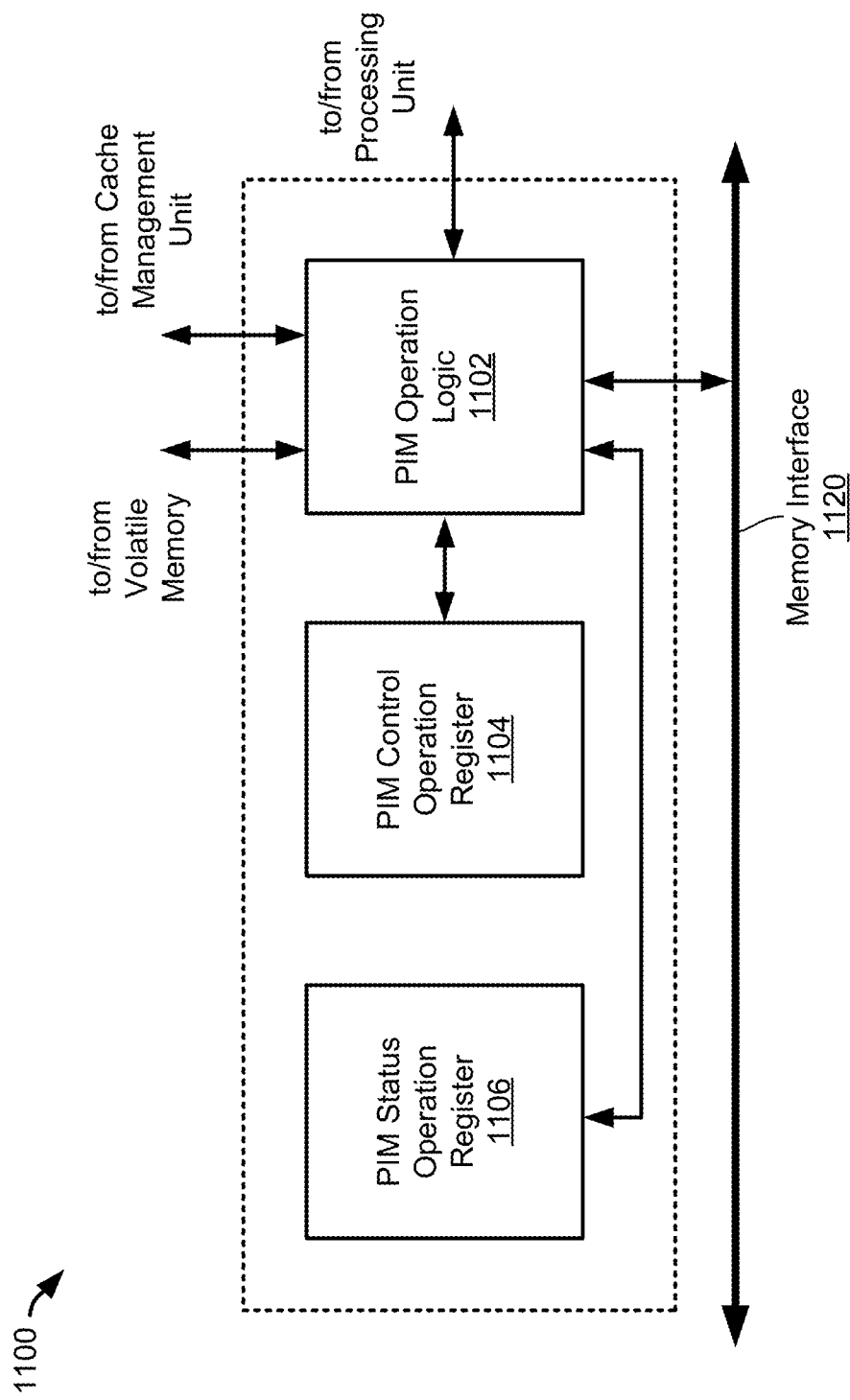
FIG. 11 is a schematic diagram showing aspects of an example PIM memory control unit in a PIM module.

FIG. 11 is a schematic diagram showing aspects of an example PIM memory control unit 1100. The example PIM memory control unit 1100 may be implemented in a PIM module, e.g., the PIM modules 900, 1000 as shown in FIGS. 9 and 10. The example PIM memory control unit 1100 is configured to communicate with volatile memory and a cache management controller. As shown in FIG. 11, the example PIM memory control unit 1100 includes a PIM operation logic 1102, a PIM control operation register 1104, and a PIM status operation register 1106. The example PIM memory control unit 1100 may include additional or different features, and the components of the example device may operate as described with respect to FIG. 11 or in another manner.

In the example PIM memory control unit 1100, the PIM operation logic 1102 is configured to initiate and to complete a PIM operation. In some instance, the PIM operation can be performed by a processing unit, for example the processing unit 1002 shown in the PIM module 1000. The PIM control operation register 1104 includes a first physical address of volatile memory of a PIM module (e.g., the volatile memory 1006 of the PIM module 1000), and the PIM status operation register 1106 includes a second physical address of the volatile memory, which the PIM module (e.g., the PIM module 1000) uses for completing the PIM operation. In some instances, each of the first and second physical addresses of the volatile memory may be one of the following: a memory address of certain bytes in a memory region or a starting address of the memory region. In some instances, the memory region can be a memory page or in another format.

During operation, when an application provides a "WRITE" operation according to the first physical address in the PIM control operation register 1104, the PIM operation logic 1102 transmits a signal to the processing unit to initiate a PIM operation. In certain instances, after initiating the PIM operation, the application performs a "READ" operation according to the second physical address stored in the PIM status operation register 1106. In some implementations, when the PIM operation is not completed by the processing unit, the PIM operation logic 1102 of the PIM memory control unit 1100 can assert an "ALERT_n" signal via the memory interface, halting a host memory controller (e.g., the host memory controller 804 in FIG. 8) for a time period. When the PIM operation is complete, the PIM operation logic 1102 may de-assert the "ALERT_n" signal and the host memory controller may resume its work. A completion of the PIM operation can be done by reading a special allocated memory in the PIM module. The methods and systems described here can eliminate completion pooling and make PIM modules more efficient.

Figure 12A:
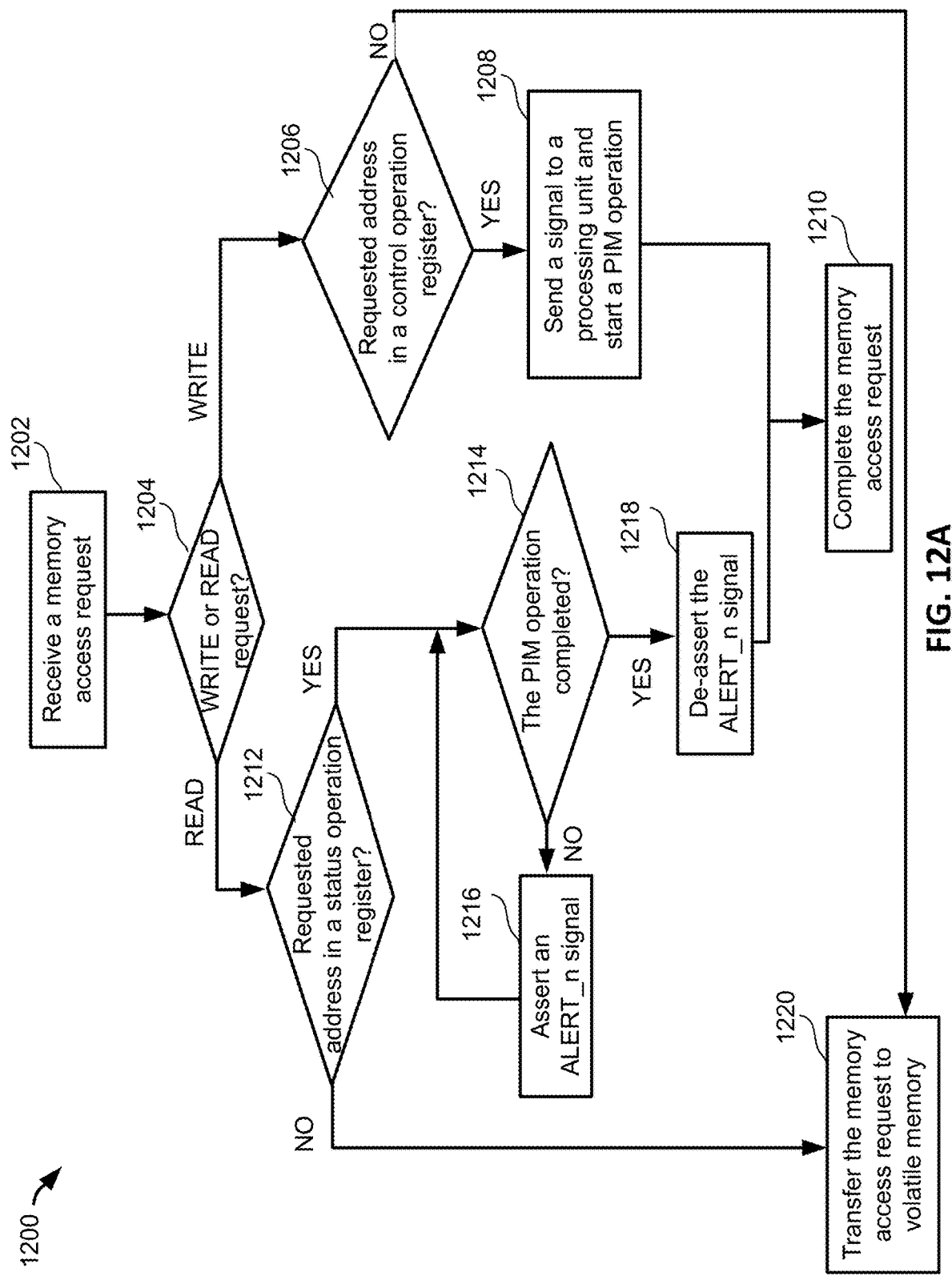
FIG. 12A is a flow diagram showing aspects of an example process.

FIG. 12A is a flow diagram showing aspects of an example process 1200. In some implementations, aspects of the example process 1200 may be performed by a PIM module for synchronization of a host memory controller and the PIM module in a memory system. For instance, operations in the example process 1200 may be performed in the PIM module 808 and the host memory controller 804 as shown in FIG. 8. The example process 1200 may include additional or different operations; and the operations may be performed in the order shown or in another order. In some cases, operations in the example process 1200 can be combined, iterated or otherwise repeated, or performed in another manner.

At 1202, a memory access request is received. In some instances, the memory access request is received by the PIM module from the host memory controller via the memory interface. In some instances, the memory access request contains a requested memory address, a request type, and data.

At 1204, a determination is made whether a memory access request is a "READ" or "WRITE" request. In some instances, the request type is determined by operation of the PIM module. In some instances, a "READ" request may include a DDR READ command and a "WRITE" request may include a DDR WRITE command.

In response to a determination that the memory access request is a "WRTIE" request during operation 1204, the process 1200 continues with operation 1206, in which a determination is made whether the requested memory address is stored in a PIM control operation register, e.g., the PIM control operation register 1104. For example, if the requested memory address is equal to the first physical address stored in the PIM control operation register, the process 1200 continues with operation 1208, in which a signal is transferred to a processing unit of the PIM module to perform respective actions as requested in the memory access request, e.g., initiating a PIM operation by the PIM memory control unit, performing computations by the processing unit, or storing result data from the PIM operation. The process 1200 continues with operation 1210, in which the memory access request is complete.

In response to a determination that the requested memory address is not in the PIM control operation register, the process 1200 continues with operation 1220, in which the memory access request is transferred to volatile memory of the PIM module. For example, the memory access request may be transferred to and stored in the volatile memory 904, 1006 of the PIM modules 900, 1000. In some instances, the memory access request stored in the volatile memory of the PIM module can be processed, for example, when the requested memory address becomes available or in another manner.

In response to a determination that the memory access request is a "READ" request during operation 1204, the process 1200 continues with operation 1212, in which a determination is made whether the requested memory address is in a PIM status operation register, e.g., the PIM status operation register 1106. For example, to determine whether the requested memory address is stored in the PIM status operation register, the requested memory address in the memory access request and the second physical address stored in the PIM status operation register can be compared. If the requested memory address is the same as the second physical address, the requested memory address is then determined as being stored in the PIM status operation register. In response to the requested address being stored in the status operation register, the process 1200 continues with operation 1214, in which a determination is made whether the PIM operation is complete or not. In response to a determination that the PIM operation is not completed, the process 1200 continues with operation 1216, in which an "ALERT_n" signal is asserted, and respective actions can be performed by the PIM module. In some instances, the "ALERT_n" signal can be asserted by the PIM module to the host memory controller to halt operations of the host memory controller for a time period.

In response to a determination that the PIM operation is not completed, another "ALERT_n" signal can be re-asserted in operation 1216 until the PIM operation is complete. In response to is the determination that the PIM operation has been completed, the process 1200 continues with operations 1218 and 1210, in which the "ALERT_n" signal is de-asserted by the PIM module, and the memory access request is complete. In response to the determination that the requested memory address is not stored in the PIM status operation register, the process 1200 continues with operation 1220, in which the memory access request is transferred to the volatile memory.

Figure 12B:
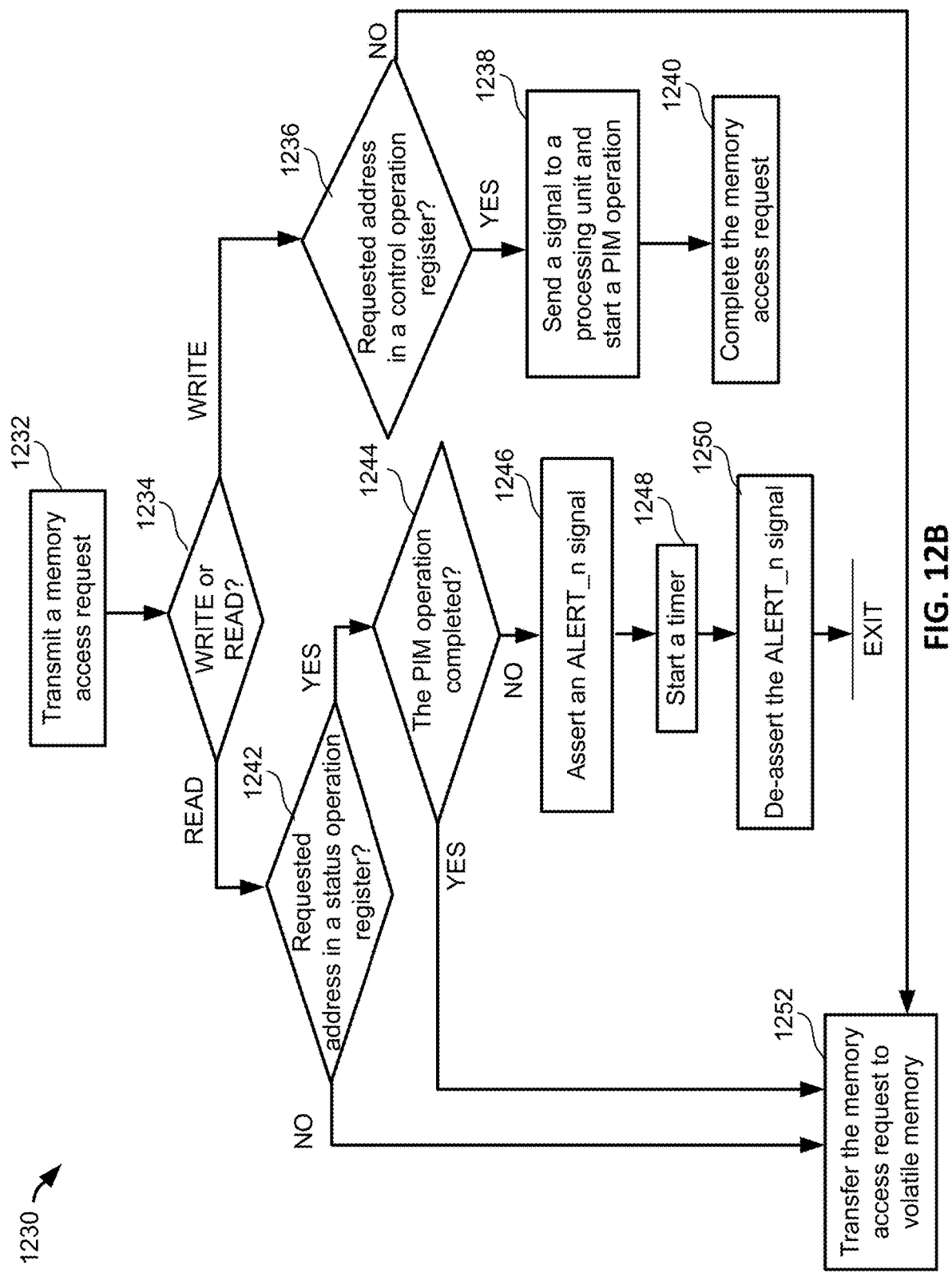
FIG. 12B is a flow diagram showing aspects of an example process.

FIG. 12B is a flow diagram showing aspects of an example process 1230. In some implementations, aspects of the example process 1230 may be performed by a PIM module for synchronization of a host memory controller and the PIM module in a memory system. For instance, operations in the example process 1230 may be performed in the PIM module 808 and the host memory controller 804 as shown in FIG. 8. The example process 1230 may include additional or different operations, the operations may be performed in the order shown or in another order. In some cases, operations in the example process 1230 can be combined, iterated or otherwise repeated, or performed in another manner.

Operations 1232, 1234, 1236, 1238, 1240, 1252, 1242 and 1244 in the process 1230 may be respectively implemented as the operations 1202, 1204, 1206, 1208, 1210, 1220, 1212, and 1214 in the process 1200 shown in FIG. 12A or in another manner.

In response to a determination that the PIM operation has not been completed during operation 1244, the process 1230 continues with operation 1246, in which an "ALERT_n" signal is asserted. In some instances, the "ALERT_n" signal can be asserted by the PIM module to the host memory controller to halt operations of the host memory controller. At 1248, a timer is started subsequently to or simultaneously with the asserted "ALERT_n" signal. In some instances, the timer can be preconfigured or programmed according to specifications of the memory system, or determined in another manner. At 1250, the "ALERT_n" signal is de-asserted. In some instances, the "ALERT_n" signal can be de-asserted by the PIM module to the host memory controller after the timer is terminated. After the "ALERT_n" signal is de-asserted, the process 1230 is terminated. In response to the determination that the PIM operation has been completed during operation 1244, the process 1230 continues with operation 1252, in which the memory access request is transferred to volatile memory of the PIM module. The central processor and the host memory controller could read a result from the memory kept in the PIM status operation register.

Figure 13:
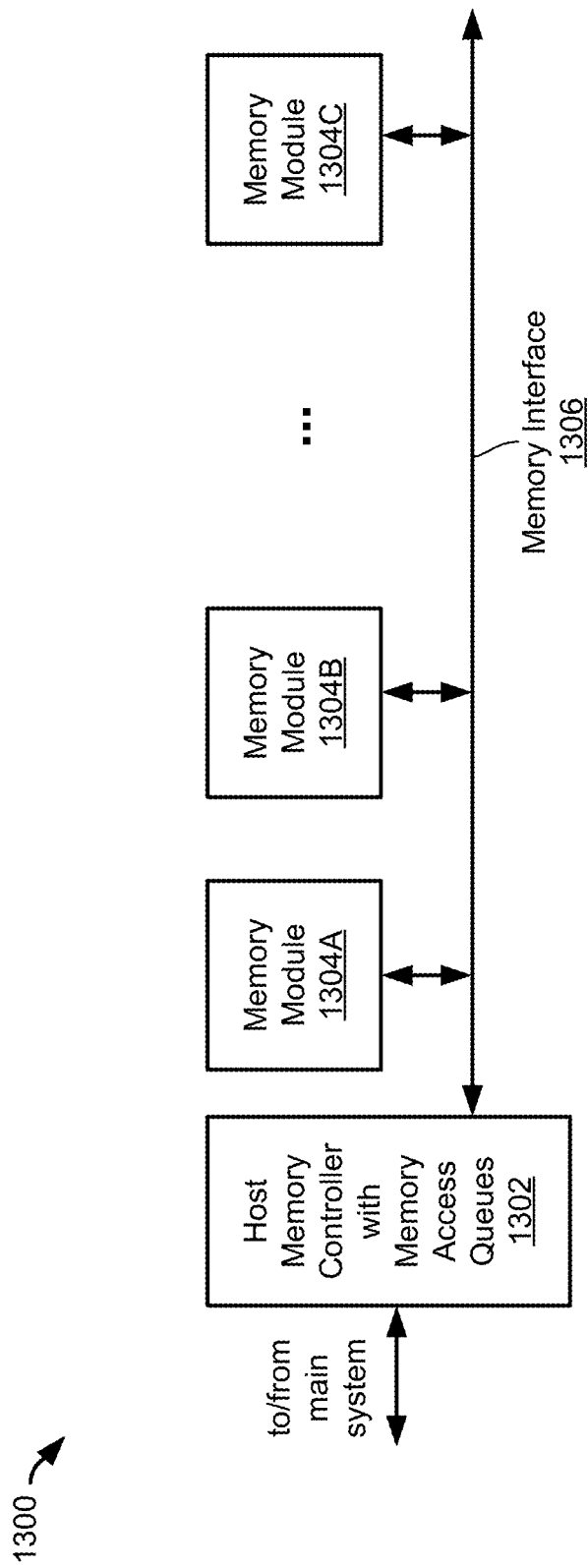
FIG. 13 is a block diagram showing aspects of an example memory system.

FIG. 13 is a block diagram showing aspects of an example memory system 1300. The example memory system 1300 shown in FIG. 13 includes a host memory controller with memory access queues 1302 and multiple memory modules 1304. The host memory controller with memory access queues 1302 and each of the one or more memory modules 1304 are communicably coupled via a memory interface 1306. In some instances, one or more of the memory modules 1304 may be implemented as the memory modules 200, 300, 900, 1000 as shown in FIGS. 2, 3, and 10, or in another manner. In certain instances, the memory interface 1306 may be implemented as the memory interface 106 as shown in FIG. 1 or in another manner. In some implementations, the example memory system 1300 may also include additional or different features (e.g., regular memory modules, and standard bus), and the components of the example memory system 1300 may operate as described with respect to FIG. 13 or in another manner.

In some implementations, the host memory controller with memory access queues 1302 includes at least two memory access queues which can provide a mechanism for queuing memory access requests. In some instances, the memory access queues in the host memory controller 1302 can be used to manage memory access requests for the memory modules 1304. In some implementations, the host memory controller 1302 can be implemented as the host memory controller 1400 shown in FIG. 14 or in another manner.

Figure 14:
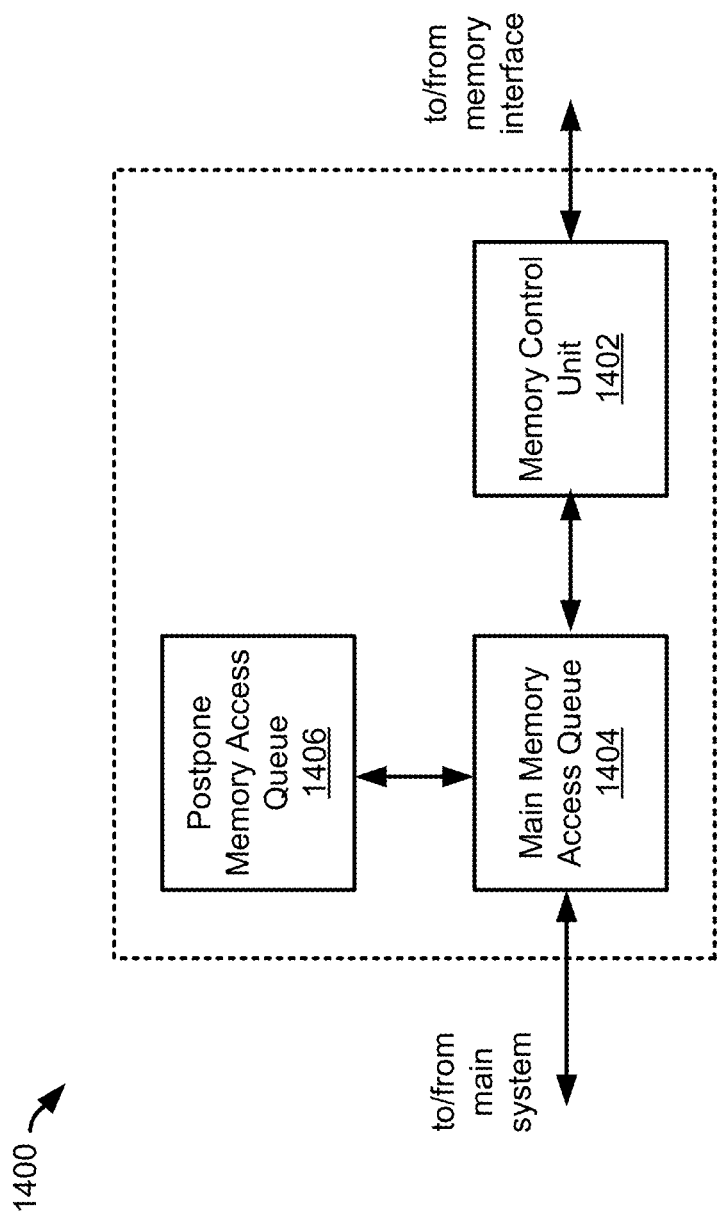
FIG. 14 is a schematic diagram showing aspects of an example host memory controller.

FIG. 14 is a schematic diagram showing aspects of an example host memory controller 1400. The example host memory controller 1400 shown in FIG. 14 includes a memory control unit 1402 and two memory access queues including a main memory access queue 1404 and a postponed memory access queue 1406. In some instances, the two memory access queues 1404, 1406 are configured for storing, accumulating, and managing memory access requests. For example, memory access requests can be accepted in the memory access queues and executed in a pre-determined order. In some implementations, the example host memory controller 1400 may also include additional or different features (e.g., regular memory modules, and standard bus), and the components of the example host memory controller 1400 may operate as described with respect to FIG. 14 or in another manner.

In some implementations, the memory control unit 1402 of the host memory controller 1400 is compatible with and supports DDR4/DDR5 standards or another standard. In some instances, the memory control unit 1402 communicates with a memory interface (e.g., the memory interface 1306 in the memory system 1300). In some instances, the main memory access queue 1404 can be used to accumulate memory access requests received from a main system and to form a request sequence for DDR operations. In some instances, the postponed memory access queue 1406 can be used to accumulate memory access requests which require more time than what can be normally provided by the DDR operations. For example, a memory access request which requires swapping data between volatile memory and non-volatile memory in a memory module, or a memory access request for reading an operation completed in a PIM module may be accumulated in the postponed memory access queue 1406 and held off from being executed. In some implementations, the main and postponed memory access queues 1404, 1406 are organized as first-in-first-out (FIFO) queues, or in another manner.

In the example host memory controller 1400, a memory access request (e.g., "READ" or "WRITE" request) can be received from a main system. The memory access request is directly stored in the main memory access queue 1404. The memory control unit 1402 is communicably coupled to and can directly access the main memory access queue 1404. When the memory control unit 1402 needs to read a memory access request from the postponed memory access queue 1406, the memory access request is read into the main memory access queue 1404 from the postponed memory access queue 1406. In some instances, the memory control unit 1402 can further transmit the memory access request to one or more memory modules for processing via the memory interface.

Figure 15:
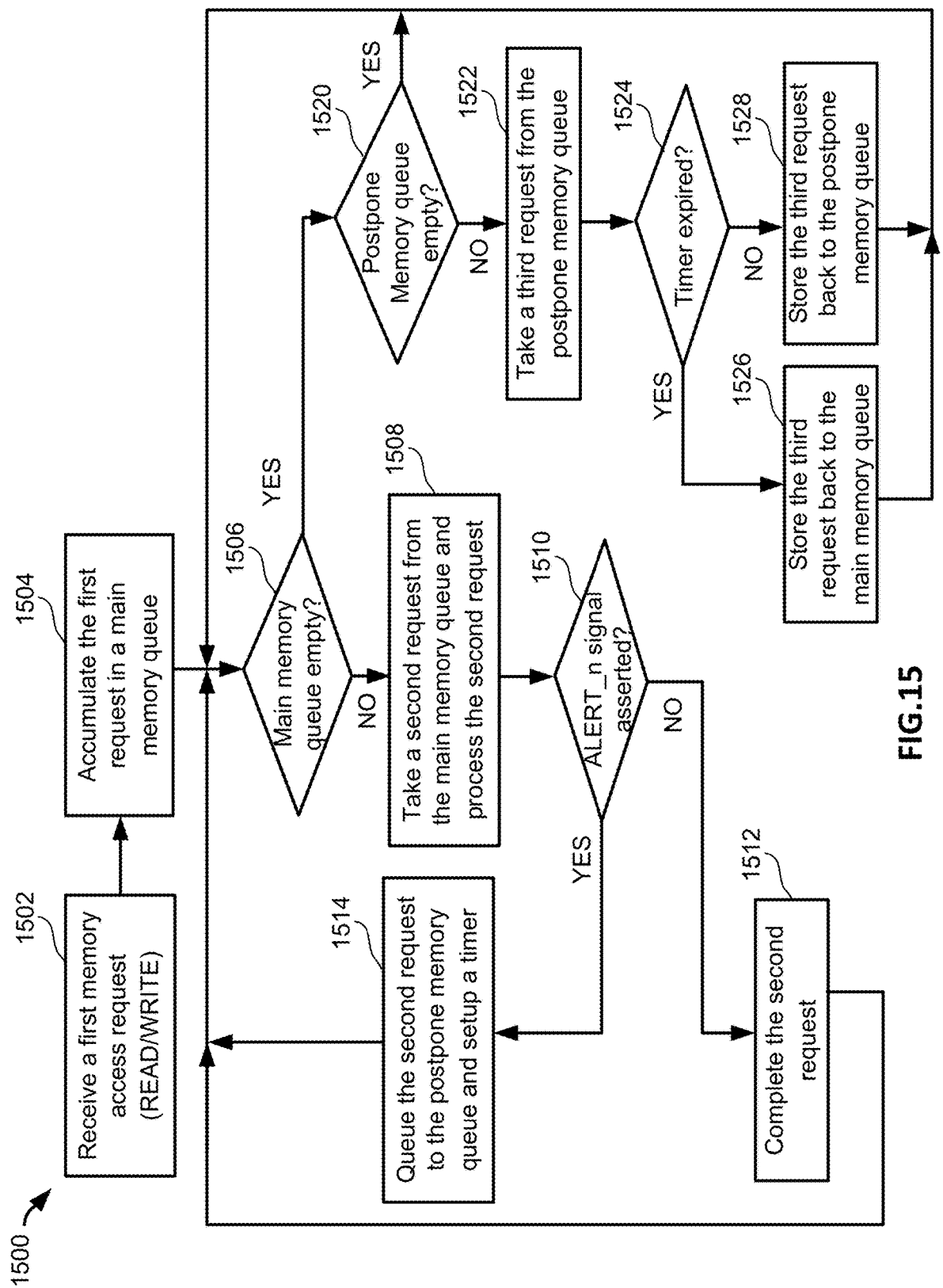
FIG. 15 is a flow diagram showing aspects of an example process.

FIG. 15 is a flow diagram showing aspects of an example process 1500. The example process 1500 may be implemented in a memory system. In some instances, the memory system may be implemented as the memory system 1300 shown in FIG. 13 or in another manner. In certain examples, aspects of the example process 1500 may be performed by a host memory controller with a mechanism for queueing (e.g., accumulating and ordering) memory access requests. In some instances, the host memory controller includes a memory control unit and two memory access queues, which may be implemented as the memory control unit 1402 and the main and postponed memory access queues 1404, 1406, or in another manner. In some instances, the example process 1500 may be used to operate a memory module (e.g., a DIMM, a PIM module, or a hybrid memory module). The example process 1500 may include additional or different operations, and the operations may be performed in the order shown or in another order. In some cases, operations in the example process 1500 can be combined, iterated or otherwise repeated or performed in another manner.

At 1502, a first memory access request is received. For example, the first memory access request can be received by the host memory controller from a main system. In some instances, the first memory access request contains a requested memory address and a request type (e.g., "READ", "WRITE", "REFRESH", or another type). The requested memory address may indicate a physical address of the memory module. The first memory access request may further include data, for example in a "WRITE" request.

At 1504, the first memory access request is accumulated in the main memory access queue. In some instances, after receiving the first memory access request, the memory control unit (e.g., the memory control unit 1402 of the host memory controller 1400) accumulates the first memory access request in the main memory access queue (e.g., the main memory access queue 1404).

At 1506, a determination is made whether the main memory access queue is empty. In certain instances, operation 1506 may be determined by the memory control unit of the host memory controller. In response to a determination that the main memory access queue is not empty, the example process 1500 continues with operation 1508, in which a second memory access request is transferred from the main memory access queue to the memory control unit and further to the memory module, where the second memory access request can be processed. For example, a DDR operation associated with the second memory access request is initiated and processed by the host memory controller and the memory module. In some instances, the second memory access request is the first memory access request.

At 1510, a determination whether an "ALERT_n" signal is asserted to the host memory controller is made. During operation 1508, when respective actions may take more time to complete, for example, when data swapping is needed between volatile memory (e.g., DRAM cache) and non-volatile memory in the memory module (e.g., a hybrid memory module), the memory module can assert an "ALERT_n" signal to the host memory controller with a minimal latency to halt the host memory controller, and initiate the data swapping.

In response to the "ALERT_n" signal being asserted, the example process 1500 continues with operation 1514, in which the second memory access request is removed from the main memory access queue and further queued in the postponed memory access queue, by operation of the memory control unit of the host memory controller. In some implementations, an internal timer is started by the memory control unit and attached to the second memory access request prior to transferring the second memory access request to the postponed memory access queue. The process 1500 continues with operation 1506, in which a determination is made whether the main memory access queue is empty or not, to continue processing the request sequence in the main memory access queue.

In response to a determination that the "ALERT_n" is not asserted by the memory module to the host memory controller, the process 1500 continues with operation 1512 in which the second memory access request is complete by operations of the host memory controller and the memory module. For example, if the data swapping is not required, e.g., requested data content is already stored in the volatile memory (e.g., the DRAM cache), the DDR operation associated with the second memory access request can be completed. After the completion of the second memory access request, the example process 1500 continues with operation 1506, in which a next memory access request in the main memory access queue is taken by the memory control unit and a next DDR operation associated with the next memory access request can be processed.

In response to a determination that the main memory access queue is empty, the example process 1500 continues with operation 1520, in which a determination is made whether the postponed memory access queue is empty or not. In some instances, determining whether the postponed memory access queue is empty is performed by the memory control unit of the host memory controller or in another manner. In response to a determination that the postponed memory access queue is empty, the example process 1500 continues with operations 1506. In response to a determination that the postponed memory access queue is not empty, a third memory access request is taken from the postponed memory access queue. In some instances, the third memory access request may be the second memory access request removed from the main memory access queue when the "ALERT_n" signal is asserted or a different memory access request in the postponed memory access queue.

At 1524, a determination is made whether the internal timer is expired. The internal timer is associated with the third memory access request read from the postponed memory access queue. In response to a determination that the internal timer is expired, the example process 1500 continues with operation 1526, in which the third memory access request is removed from the postponed memory access queue and queued back to the main memory access queue for further processing. In response to a determination that the internal timer is not expired, the example process 1500 continues with operation 1528, in which the third memory access request is re-queued back in the postponed memory access queue. In some instances, when the third memory access request is re-queued back to the postponed memory access queue, the third memory access request may have a different processing order in the postponed memory access queue. In some instances, if more time is required by the memory module to process a memory access request, the memory module may re-assert the "ALERT_n" signal again and the memory control unit can also re-queue the third memory access request back in the postponed memory access queue. The process 1500 continues with operation 1506.

Figure 16A:
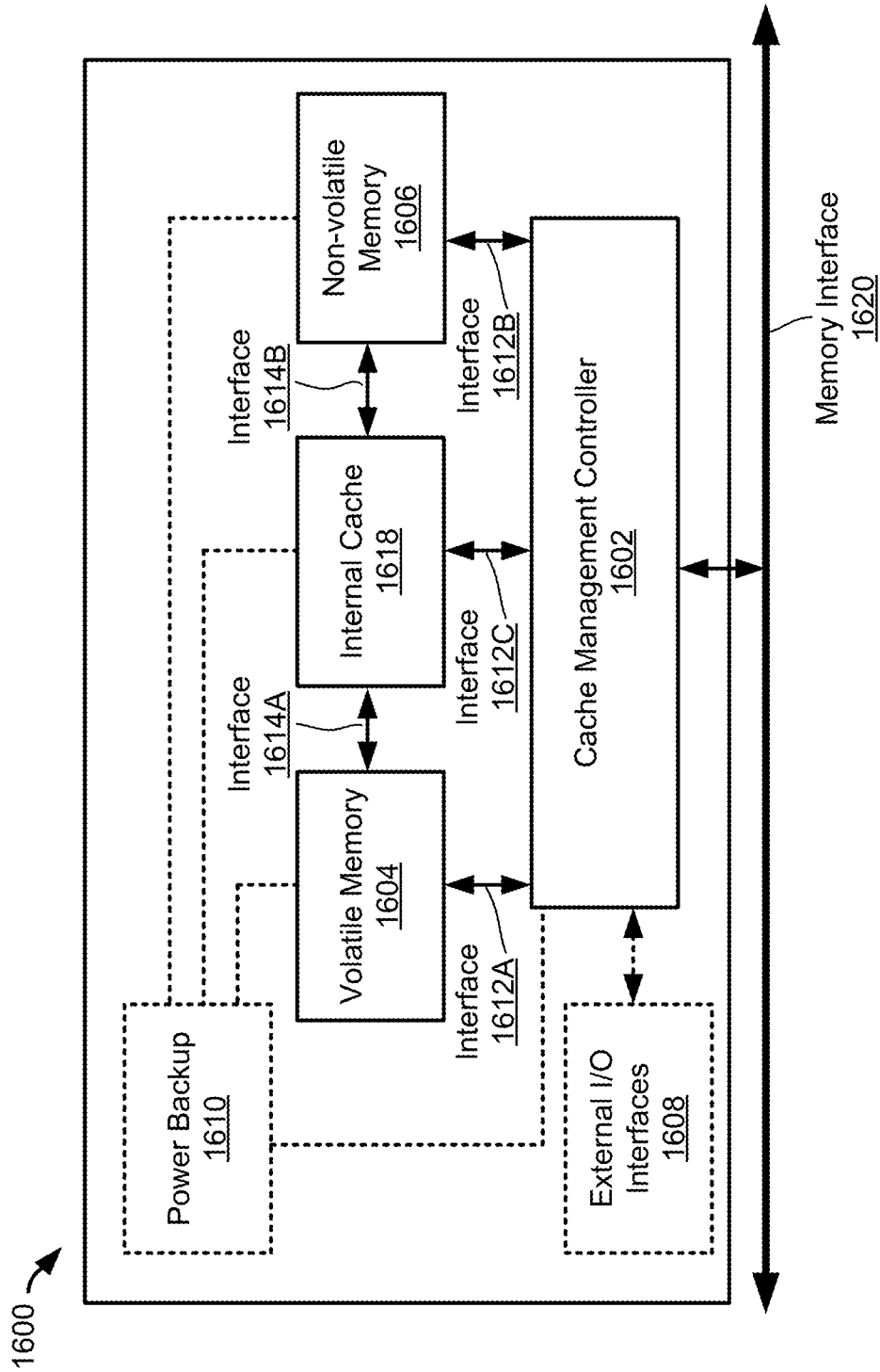
FIG. 16A is a block diagram showing aspects of an example memory module.
Figure 21A:
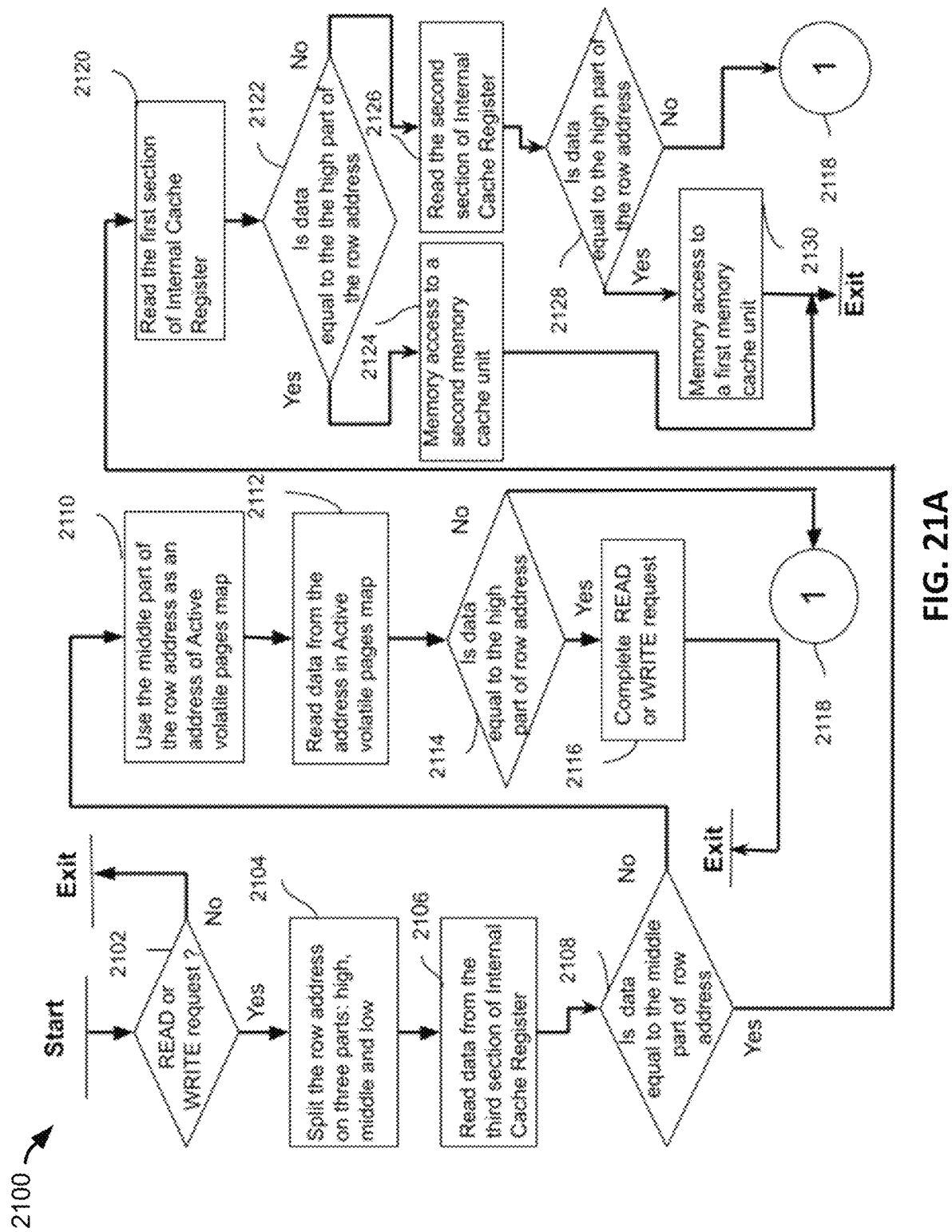
FIG. 21A is a flow diagram showing aspects of an example process.
Figure 21B:
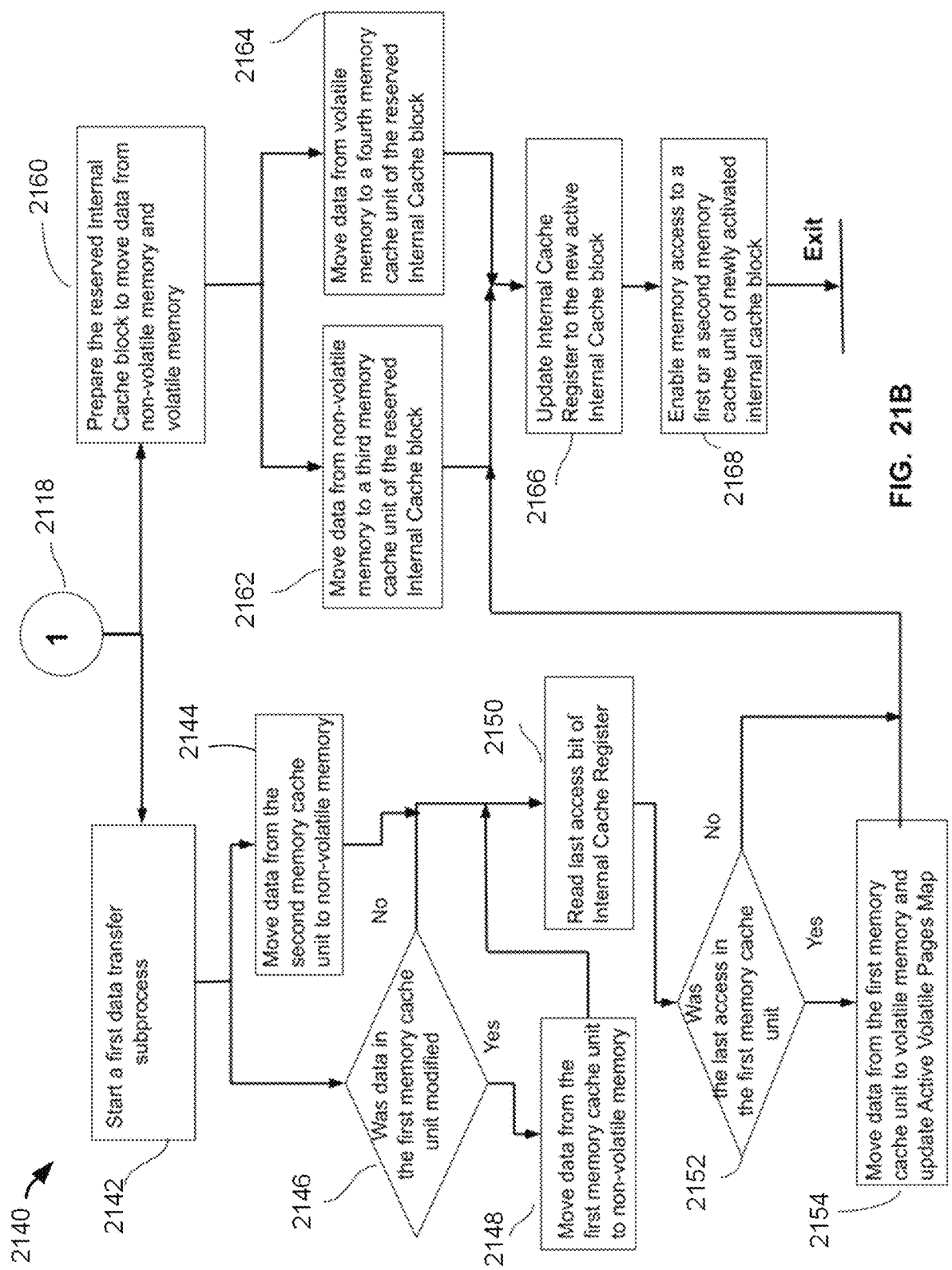
FIG. 21B is a flow diagram showing aspects of an example process.

FIG. 16A is a block diagram showing aspects of an example memory module 1600. The example memory module 1600 may be used in a memory system, e.g., the memory systems 100, 800, and 1300 shown in FIGS. 1, 8, and 13, or in another system. The example memory module 1600 shown in FIG. 16A is a hybrid memory module which includes a cache management controller 1602, volatile memory 1604, non-volatile memory 1606, and an internal cache 1618. The example memory module 1600 may include additional or different features, and the components of the example system may operate as described with respect to FIG. 16A or in another manner. For example, the example memory module 1600 further includes an external input/output (I/O) interface 1608 and a power backup 1610. The example memory module 1600 may be operated with respect to operations in the example processes 2100, 2140 as shown in FIGS. 21A, 21B.

As shown in FIG. 16A, the example memory module 1600 is communicably coupled to a memory interface 1620 through the cache management controller 1602. In some instances, the memory interface 1620 may be implemented as the memory interface 106 as shown in FIG. 1 or in another manner. In some implementations, the cache management controller 1602 may be communicably coupled to the volatile memory 1604, the non-volatile memory 1606, and the internal cache 1618 via respective interfaces. Specifically, the cache management controller 1602 is communicably coupled to the volatile memory 1604 through a first interface 1612A; the cache management controller 1602 is communicably coupled to the non-volatile memory 1606 through a second interface 1612B; and the cache management controller 1602 is communicably coupled to the internal cache 1618 through a third interface 1612C. In some instances, the interface 1612A may be implemented as the memory interface 1620 according to a DIMM standard. In some implementations, each of the interfaces 1612A, 1612B, 1612C may be implemented according to the type of memory used in the volatile memory 1604, the internal cache 1618, and the non-volatile memory 1606.

In some implementations, the internal cache 1618 is configured to store intermediate data when performing a memory access process according to a memory access request received from a host memory controller, which is communicably coupled to the memory module 1600 via the memory interface 1620. For example, the internal cache 1618 stores data from a most recent non-volatile memory access operation. The internal cache 1618 comprises volatile memory based on, for example, static random-access memory (SRAM), dynamic random-access memory (DRAM), or another type of volatile memory technology. The internal cache 1618 of the example memory module 1600 is directly coupled with the volatile memory 1604 and the non-volatile memory 1606 through respective interfaces 1614. Specifically, the internal cache 1618 is communicably coupled to the volatile memory 1604 through a fourth interface 1614A; and the internal cache 1618 is communicably coupled to the non-volatile memory 1606 through a fifth interface 1614B. In some instances, each of the fourth and fifth interfaces 1614A, 1614B may be implemented as a direct memory access (DMA) interface or another type of interface.

Figure 17A:
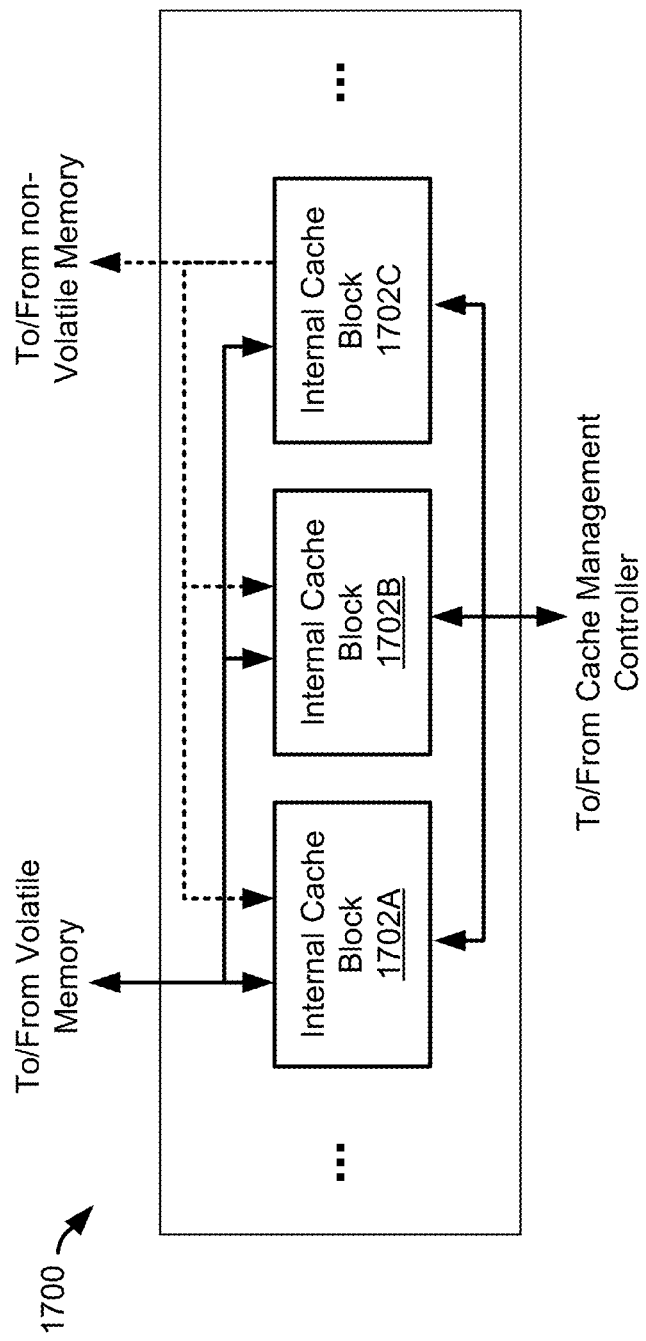
FIG. 17A is a block diagram showing aspects of an example internal cache.
Figure 17B:
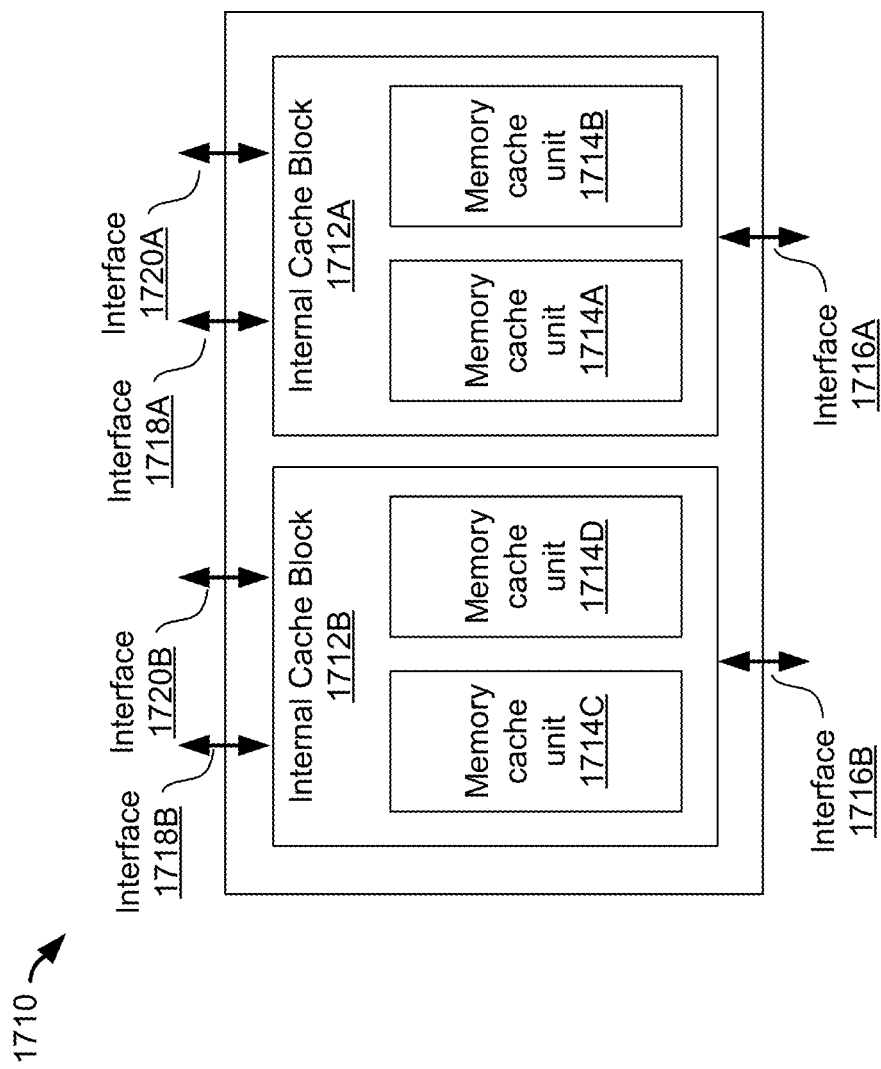
FIG. 17B is a block diagram showing aspects of an example internal cache.

In some implementations, the internal cache 1618 can be divided into two or more internal cache blocks. An internal cache block is a portion or a segment of the total storage capacity of the internal cache 1618. Each of the internal cache blocks contains at least two memory cache units that can be used for storing intermediate data received from the non-volatile memory or the volatile memory. In some implementations, the internal cache 1618 may be implemented as the example internal cache 1700, 1710 as shown in FIG. 17A, 17B, or in another manner.

Figure 18:
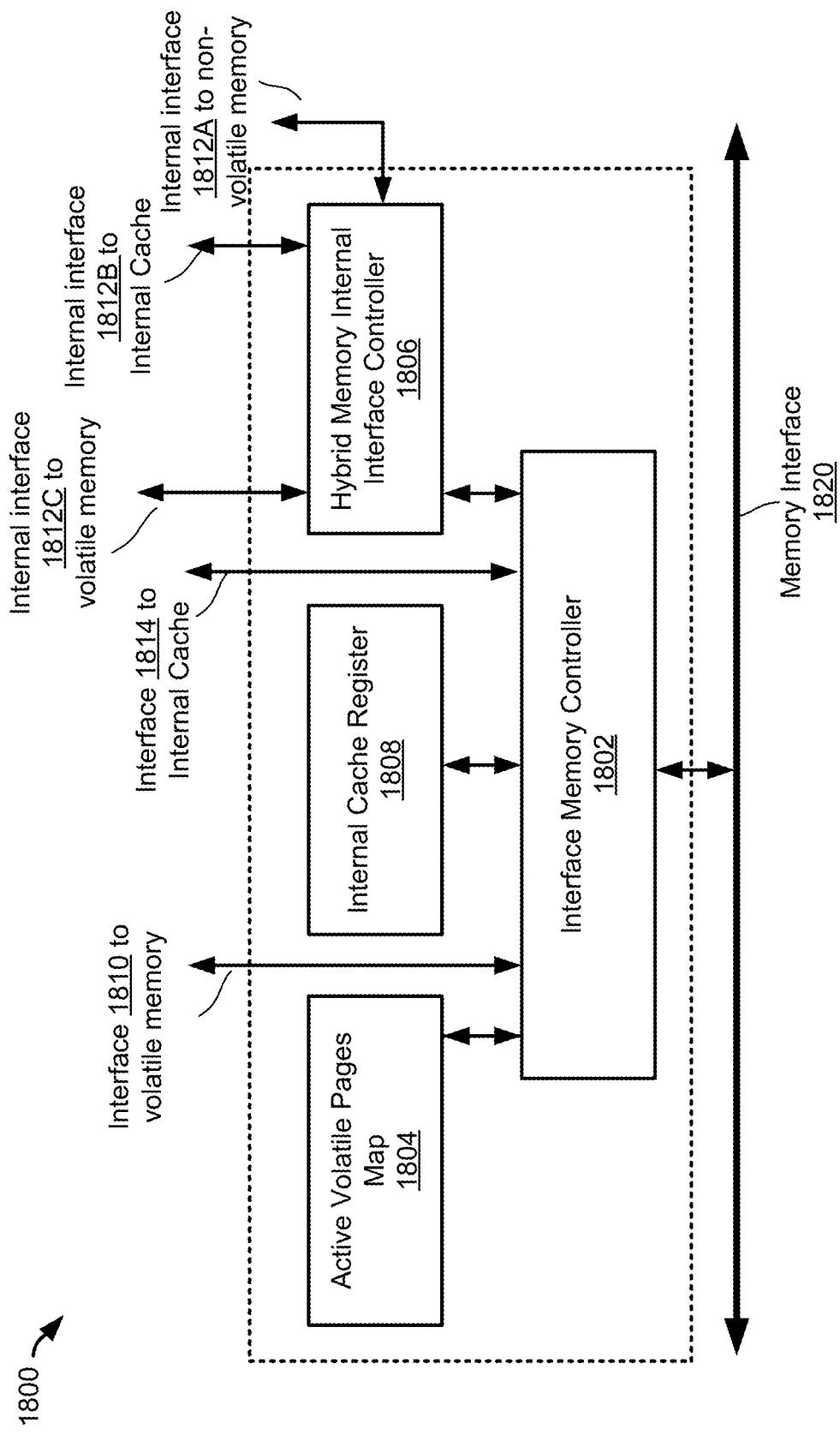
FIG. 18 is a block diagram showing aspects of an example cache management controller.

In the example memory module 1600 shown in FIG. 16A, the cache management controller 1602 is configured to perform operations such as, managing data flow between the volatile memory 1604 and the non-volatile memory 1606, for example according to control signals received on the memory interface 1620 from a host memory controller (e.g., the host memory controller 102 in FIG. 1). In some implementations, data is directly transferred between the volatile memory 1604 or the non-volatile memory 1606 and the internal cache 1618 via the respective interfaces 1614A, 1614B. In certain implementations, data is indirectly transferred between the volatile memory 1604 or the non-volatile memory 1606 and the internal cache 1618 via the cache management controller 1602 through the respective interfaces 1612A, 1612B and 1612C. The cache management controller 1602 is configured to provide mapping of the volatile memory 1604 into memory requested by a host memory controller in a memory access request. In certain instances, the cache management controller 1602 may be configured to perform another operation as part of the example processes 2100, 2140 shown in FIGS. 21A, 21B. In certain instances, the cache management controller 1602 may be implemented as the cache management controller 1800 as shown in FIG. 18 or in another manner.

Figure 16B:
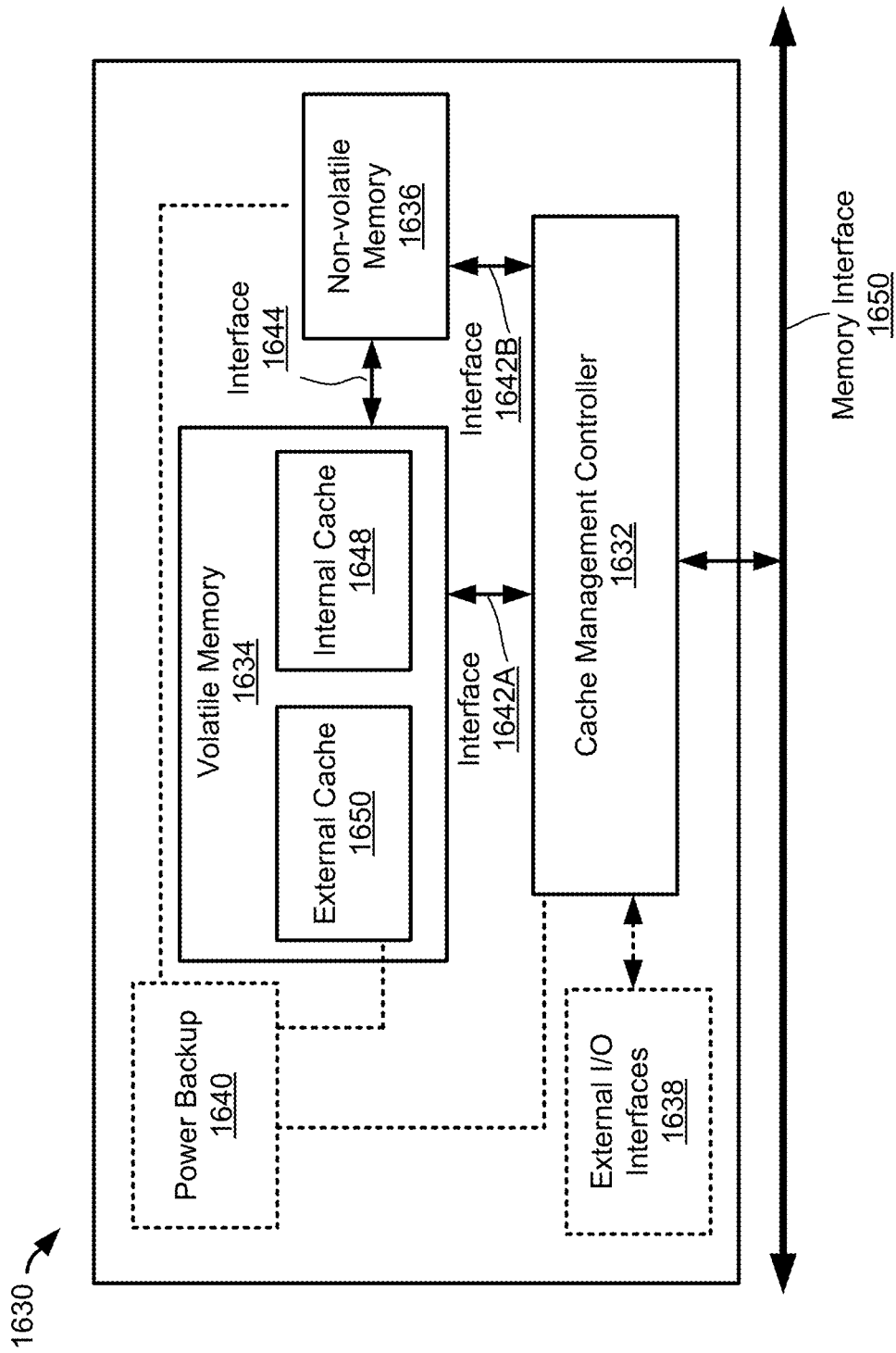
FIG. 16B is a block diagram showing aspects of an example memory module.

FIG. 16B is a block diagram showing aspects of an example memory module 1630. The example memory module 1630 may be used in a memory system, e.g., the memory systems 100, 800, and 1300 shown in FIGS. 1, 8, and 13, or in another system. The example memory module 1630 shown in FIG. 16B is a hybrid memory module which includes a cache management controller 1632, volatile memory 1634, non-volatile memory 1636. In some implementations, the volatile memory 1634 includes dynamic random-access memory (DRAM) or another type of memory. The example memory module 1630 may include additional or different features, and the components of the example system may operate as described with respect to FIG. 16B or in another manner. For example, the example memory module 1630 further includes an external input/output (I/O) interface 1638 and a power backup 1640. The example memory module 1630 may be operated with respect to operations in the example processes 2100, 2140 as shown in FIGS. 21A, 21B. In some instances, the components of the memory module 1630 may be implemented as the corresponding components of the memory module 1600 shown in FIG. 16A or in another manner.

As shown in FIG. 16B, the volatile memory 1634 of the memory module 1630 includes an internal cache 1648. In this case, the internal cache 1648 is a portion or a segment of the volatile memory 1634 occupying a portion of the storage capacity of the volatile memory 1634. The volatile memory 1634 further includes an external cache 1650, which occupies a distinct portion or segment of the volatile memory 1634 occupying a distinct portion of the storage capacity of the volatile memory 1634. The volatile memory 1634 is communicably coupled to the non-volatile memory 1636 via an interface 1644, which may be implemented as a DMA interface or another type of interface. In some implementations, the internal cache 1648 is configured to store intermediate data when performing a memory access process according to a memory access request received from a host memory controller, which is communicably coupled to the memory module 1630 via the memory interface 1650. For example, the internal cache 1648 stores data from a most recent memory access process to the external cache 1650 of the volatile memory 1634 or the non-volatile memory 1636.

In some implementations, the internal cache 1648 can be divided into two or more internal cache blocks. An internal cache block is a portion or a segment of the total storage capacity of the internal cache 1648. Each of the internal cache blocks contains at least two memory cache units that can be used for storing intermediate data received from the non-volatile memory or the volatile memory. In some implementations, the internal cache 1648 may be implemented as the internal cache 1618, 1700, 1710 in FIG. 16A, 17A, 17B or in another manner. The internal cache 1648 of the memory module 1630 may be operated as described in FIG. 16A or with respect to operations in the example processes 2100, 2140 as shown in FIGS. 21A, 21B.

In some implementations, the total storage capacity of the internal cache 1648 and the starting address in the volatile memory 1634 for the internal cache 1648 are predefined. In certain examples, the internal cache 1648 can be reconfigured dynamically. For example, the total storage capacity of the internal cache 1648 can be resized, changed, or otherwise modified. For another example, the starting address of the volatile memory 1634 for the internal cache 1648 can be changed or updated. In some implementations, the total storage capacity of the internal cache 1648 is determined by the number of entries of the internal cache register (e.g., the internal cache register 1808 in FIG. 18) or in another manner.

FIG. 17A is a block diagram showing aspects of an example internal cache 1700. The example internal cache 1700 may be used as part of a hybrid memory module for storing intermediate data between volatile memory and non-volatile memory. The internal cache 1700 can be used for parallel data processing to allow execution of memory access requests efficiently, and to reduce processing time for solving complex problems. In some implementations, the example internal cache 1700 is volatile memory, which may be implemented as the internal cache 1618 in the example memory module 1600 of FIG. 16A or the internal cache 1648 of the volatile memory 1634 of the example memory module 1630 of FIG. 16B. As shown in FIG. 17A, the internal cache 1700 is partitioned into multiple internal cache blocks 1702. Three of the multiple internal cache blocks 1702A, 1702B, 1702C are shown in FIG. 17A. The example internal cache 1700 may include additional or different features, and the components of the example system may operate as described with respect to FIG. 17 or in another manner.

In the example shown in FIG. 17A, the example internal cache 1700, as part of a memory module, interfaces with other components in the memory module. For example, the internal cache 1700 interfaces with volatile memory (e.g., the volatile memory 1604 in FIG. 16A), non-volatile memory (e.g. the non-volatile memory 1606 in FIG. 16A), and a cache management controller (e.g., the cache management controller 1602 in FIG. 16A). Particularly, each of the internal cache blocks 1702A, 1702B, 1702C are communicably coupled with the volatile memory, the non-volatile memory, and the cache management controller.

When volatile memory is used as an internal cache, the volatile memory can be segmented into two or more internal cache blocks. In some instances, the two or more internal cache blocks in an internal cache are the same size and the size of each of the internal cache blocks can be predetermined.

In some aspects, the multiple internal cache blocks 1702 include one or more "active" internal cache blocks and at least one "reserved" internal cache block. In some implementations, an active internal cache block is an internal cache block that contains valid data from the recent memory transaction, e.g., the recent memory access process. In some implementations, a reserved cache block is an internal cache block that can be used in a next data swapping process.

FIG. 17B is a block diagram showing aspects of an example internal cache 1710. The example internal cache 1710 may be used as part of a hybrid memory module for storing intermediate data between volatile memory and non-volatile memory during a memory access process. For example, the example internal cache 1710 may be implemented as the internal cache 1618 of the example memory module 1600 shown in FIG. 16A, the internal cache 1648 of the volatile memory 1634 of the example memory module 1630 of FIG. 16B, or in another manner. The internal cache 1710 can be used for parallel data processing to allow for efficient execution of memory access requests, reduce processing time. The example internal cache 1710 shown in FIG. 17B includes two internal cache blocks 1712A, 1712B. The example internal cache 1710 may include additional or different features, and the components of the example system may operate as described with respect to FIG. 17B or in another manner.

In some instances, the two internal cache blocks 1712A, 1712B of the internal cache 1710 may include the same type of volatile memory, may have the same memory size, or may be configured in another manner. In certain examples, the two internal cache blocks 1702A, 1702B may be configured differently with different types of memory or different memory sizes. In some implementations, the two internal cache blocks can be preconfigured. For example, the number of internal cache blocks and the size of each of the internal cache blocks may be determined according to a total storage capacity of the internal cache, or another parameter. In some instances, the internal cache blocks may be organized according to memory addresses of the internal cache 1710. For example, addresses in a first range may be grouped as a first internal cache block and address in a second range may be grouped as a second internal cache block.

The internal cache 1710 is communicably coupled with volatile memory, non-volatile memory, and a cache management controller. As shown in FIG. 17B, each of the two internal cache blocks 1712A, 1712B of the internal cache 1710 is communicably coupled to the volatile memory, the non-volatile memory, and the cache management controller via respective interfaces. Specifically, the internal cache block 1712A is communicably coupled with the volatile memory through an interface 1720A, coupled with the non-volatile memory through an interface 1718A, and coupled with the cache management controller through an interface 1716A. Similarly, the internal cache block 1712B is communicably coupled with the volatile memory through an interface 1720B, coupled with the non-volatile memory through an interface 1718B, and coupled with the cache management controller through an interface 1716B.

As shown in FIG. 17B, each of the internal cache blocks 1712A, 1712B contains two memory cache units 1714 and each of the two memory cache units is used for storing intermediate data received from the volatile memory or the non-volatile memory during a memory access process. Specifically, the internal cache block 1712A contains two memory cache units 1714A, 1714B and the internal cache block 1712B contains two memory cache units 1714C, 1714D. In some instances, the internal cache blocks 1712A, 1712B include an active internal cache block which is used in a current data transferring process in response to a current memory access request. In some instances, the internal cache blocks 1712A, 1712B include a reserved internal cache block which is prepared for performing a new data transferring process in response to a new data swapping operation which moves data from the non-volatile memory and the volatile memory to the internal cache. When the current memory access request is complete, the active internal cache block becomes reserved and the reserved internal cache block becomes active. Status, e.g., either active or reserved, of an internal cache block can be indicated in a cache management controller, for example in the internal cache register 1808 of the cache management controller 1800.

Figure 19:
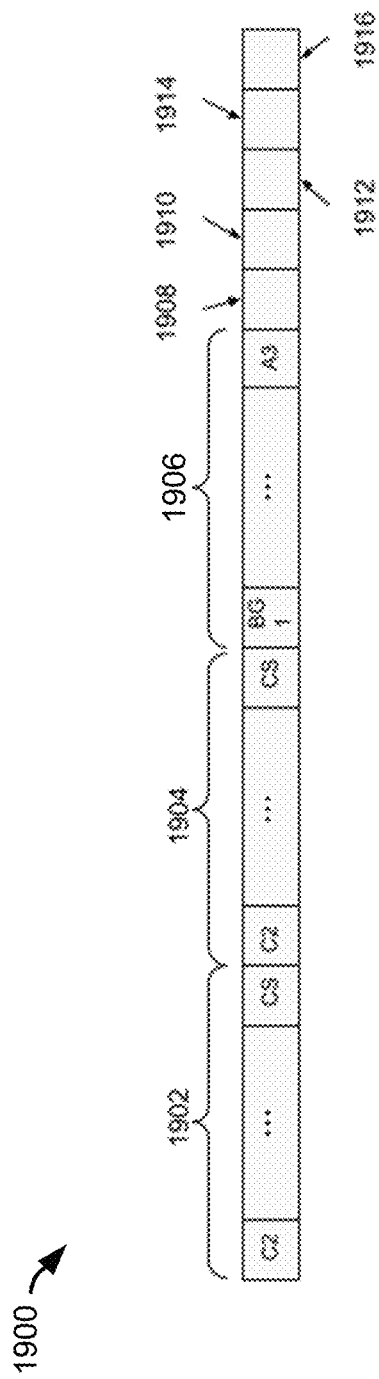
FIG. 19 is a schematic diagram showing an example format of an internal cache register.

In some implementations, a first memory cache unit 1714A and a second memory cache unit 1714B of the first internal cache block 1712A may be designated for storing data either from the volatile memory or the non-volatile memory. For example, the first memory cache unit 1714A may only receive data from one of the volatile memory and the non-volatile memory; and the second memory cache unit 1714B may only receive data from the other one of the volatile memory and the non-volatile memory. Similarly, a third memory cache unit 1714C and a fourth memory cache unit 1714D of the second internal cache block 1712B may be also designated for storing data either from the volatile memory or the non-volatile memory. In some other implementations, each of the memory cache units 1714 in an internal cache block 1712 may be dynamically assigned during a memory access process. For example, the first memory cache unit 1714A may receive from, and transfer data to, the non-volatile memory during a first memory access process; the first memory cache unit 1714A may receive from, and transmit data to, the volatile memory during a second memory access process; and the first memory cache unit 1714 may receive data from the non-volatile memory and transfer the data to the volatile memory during a third memory access process. In some implementations, dynamic assignment of memory cache units for volatile or non-volatile memory may be indicated by data stored in the internal cache register, e.g., the sixth section 1912 as shown in FIG. 19. In some implementations, the internal cache 1710 may be operated according to the processes 2100, 2130 as shown in FIGS. 21A-21B.

In some instances, each of the memory cache units of an internal cache block is designated for receiving data from only one type of memory. For example, the memory cache unit 1714A only receives and stores data from the volatile memory and can transfer the stored data back to the volatile memory or to the non-volatile memory according to the memory access process; and the memory cache unit 1714B only receives and stores data from the non-volatile memory and can transfer the stored data back to the non-volatile memory or to the volatile memory according to the memory access process. In this case, a memory cache unit in an internal cache block only receives data from one type of memory during different memory access processes.

FIG. 18 is a block diagram showing aspects of an example cache management controller 1800. The example cache management controller 1800 may be used in a memory module, e.g., implemented as the cache management controller 1602 of the memory module 1600 shown in FIG. 16A, or in another module. The example cache management controller 1800 may be implemented as the cache management controller 1602 in the example memory module 1600 shown in FIG. 16A, as the cache management controller 1632 in the example memory module 1630, or in another manner. The example cache management controller 1800 includes an interface memory controller 1802, an active volatile pages map 1804, a hybrid memory internal interface controller 1806, and an internal cache register 1808. As shown, the interface memory controller 1802 is communicably coupled to the active volatile pages map 1804, the hybrid memory internal interface controller 1806, and the internal cache register 1808 through respective interfaces which depend on the type of memory used in the respective components. The interface memory controller 1802 is communicably connected to a memory interface 1820, which may be implemented as the memory interfaces 106 as shown in FIG. 1 or in another manner. The example cache management controller 1800 may include additional or different features, and the components of the example controller may operate as described with respect to FIG. 18 or in another manner.

As shown in the example cache management controller 1800, the interface memory controller 1802 is configured to provide communications with a host memory controller (e.g., the host memory controller 102 in FIG. 1) via the memory interface 1820 and to manage DDR operations. In some instances, the interface memory controller 1802 is configured to decode a row address received in a memory access request. In some instances, the memory access request can be issued by and received from the host memory controller. The row address may have a format as shown in the example row address 2000 of FIG. 20 or may have a different format. The interface memory controller 1802 is configured to further transfer the row address issued by the host memory controller to the active volatile pages map 1804.

In the example shown here, the interface memory controller 1802 is communicably coupled with the volatile memory (e.g., the volatile memory 1604 of the example memory module 1600 in FIG. 16A) and the internal cache (e.g., the internal cache 1618 of the example memory module 1600 in FIG. 16A) through respective interface 1810 and 1814. When the cache management controller 1800 is communicably coupled with the example memory module 1600 in FIG. 16A, the interface 1810 is implemented as the interface 1612A, the interface 1814 is implemented as the interface 1612C, and the interface 1812C can be omitted. When the cache management controller 1800 is communicably coupled with the example memory module 1630 in FIG. 16B, the interface 1810 is implemented as the interface 1642A and the internal interface 1812C is implemented as the interface 1644.

In some implementations, the hybrid memory internal interface controller 1806 is configured to manage the non-volatile memory and make compatible/accessible data. In some instances, the hybrid memory internal interface controller 1806 is communicably coupled to the non-volatile memory (e.g., the non-volatile memory 1606 in the example memory module 1600 of FIG. 16A or the non-volatile memory 1636 in the example memory module 1630 of FIG. 16B) and the internal cache (e.g., the internal cache 1618 in the example memory module 1600 of FIG. 16A or the internal cache 1648 in the example memory module 1630 of FIG. 16B) via respective internal interfaces 1812A, 1812B. In some instances, the internal interface 1812A corresponds to the interfaces 1718A, 1718B in FIG. 17B; the interface 1812B corresponds to the interfaces 1720A, 1720B in FIG. 17B; and the interface 1814 corresponds to the interfaces 1716A, 1716B in FIG. 17B.

In some implementations, the internal cache register 1808 which may be implemented as volatile memory containing multiple bits for storing row addresses of previous data transferring operations. The length and structure of the internal cache register 1808 are defined by the number and size of the internal cache blocks in the internal cache. When an internal cache includes two internal cache blocks, the internal cache register 1808 may have the format of the internal cache register 1900 shown in FIG. 19. When the internal cache are divided into multiple (e.g., three or more) internal cache blocks, the internal cache register 1808 may contain additional bits and sections (e.g., a range of bits in the internal cache register) associated with each of the multiple internal cache blocks. For example, when the internal cache is divided into m internal cache blocks (m≥3, m is a positive integer), the internal cache register 1808 may include m first sections 1902, m second sections 1904, and m third sections 1906. The internal cache register 1808 may further include a fourth section, which includes more than one bits, e.g., m+1 number of bits.

In some implementations, the active volatile pages map 1804 may be implemented as very fast volatile memory with a low latency, for example as SRAM, or another type of volatile memory. In some instances, the active volatile pages map 1804 is configured to store the information about active pages of the volatile memory. In certain instances, an active page is a memory page in which data is kept in the volatile memory. In some implementations, the size of the active volatile pages map 1804 is determined according to the width of the row address. The middle part 2004 may address volatile memory of 2 GB in a memory module of 512 GB. The size of the active volatile pages map is equal to $2^N$, where N is a number of bits (signal lines) in the middle part 2004. In the example row address 2000 shown in FIG. 20, the middle part 2004 contains 15 bits which could address the active volatile pages map of 32 KB. In some implementations, the size of the active volatile pages map 2004 may have a different value and may be determined in another manner.

In some implementations, each address in the active volatile pages map 1804 contains information about the high part 2002 of a memory page of the volatile memory, where data is stored. In some instances, the address in the active volatile pages map 1804 has a format shown in the example active volatile pages map 510 shown in FIG. 5B.

FIG. 19 is a schematic diagram showing an example format of an internal cache register 1900. The internal cache register 1900 includes multiple bits and the multiple bits of the internal cache register 1900 can be divided into multiple sections 1902, 1904, 1906, 1908, 1910, 1912, 1914, and 1916. Each of the sections includes a distinct range of bits in the internal cache register 1900. A first section 1902 of the internal cache register 1900 stores a high part of a row address of the volatile memory, and a second section 1904 of the internal cache register 1900 stores a high part of the row address of the non-volatile memory. The length (e.g., number of bits) and structure of the first section 1902 and the second section 1904 of the internal cache register may be determined by the high part of the row address. The first section 1902 includes a first range of bits and the second section 1904 includes a second, distinct range of bits. As shown in the example, each of the first section 1902 and the second section 1904 of the internal cache register includes 8 bits, which is the same as the high part 402 of the row address in FIG. 4, and the high part 2002 of the row address 2000 in FIG. 20. A third section 1906 represents the middle part of the row address and a third section 1906 includes a third, distinct range of bits. In the example shown in FIG. 19, the third sections 1906 includes 15 bits, which is the same as the middle part 2004 of the row address 2000 in FIG. 20.

As shown in FIG. 19, each of sections 1908, 1910, 1912, 1914, and 1916 includes one bit. A fourth section 1908 is a status bit indicating which one of the internal cache blocks in the internal cache is currently active. For example, when the value of the fourth section 1908 is "0", the internal cache block 1712A is "non-active". Otherwise, when the value of the fourth section 1908 is "1", the internal cache block 1712B is "active". A fifth section 1910 includes a last-access bit. For example, when the value of the fifth section is "0", the last memory operation of the internal cache (e.g., the internal cache 1618 or 1648 as shown in FIGS. 16A, 16B) was from a memory cache unit (e.g., the memory cache unit 1714D of the active internal cache block 1712B) which stores data received from the volatile memory (e.g., the volatile memory 1604 in FIG. 16A or the external cache 1650 of the volatile memory 1634 in FIG. 16B). Otherwise, when the value of the last access bit is "1", the last memory operation was from another memory cache unit which stores data to the non-volatile memory (e.g., the memory cache unit 1714C of the internal cache block 1712B. A sixth section 1912 includes one bit and can be used to indicate which type of memory data belongs to a memory cache unit of an internal cache block. For example, when the value of the sixth section 1912 is "0", a memory cache unit (e.g., the memory cache unit 1714A) is configured to store data received from the volatile memory (e.g., the volatile memory 1604 in FIG. 16A or the external cache 1650 of the volatile memory 1634 in FIG. 16B) and the other memory cache unit (e.g., the memory cache unit 1714B) is configured to store data received from the non-volatile memory (e.g., the non-volatile memory 1606 or 1636 in FIGS. 16A, 16B); when the value of the sixth section 1912 is "1", the memory cache unit (e.g., the memory cache unit 1714A) is configured to store data received from the non-volatile memory (e.g., the non-volatile memory 1606 or 1636 in FIGS. 16A, 16B) and the memory cache unit (e.g., the memory cache unit 1714B) is configured to store data received from the volatile memory (e.g., the volatile memory 1604 in FIG. 16A or the external cache 1650 of the volatile memory 1634 in FIG. 16B). In some instances, when an internal cache includes more than two internal cache blocks and thus more than one active internal cache blocks, the fourth section 1908 includes more than one bit to properly define internal cache blocks that are active. For example, the fourth section 1908 may include a bit map, where each bit in the bit map with a value of '1' would define a corresponding internal cache block as "active". The fifth section 1910 defines the last operation before swapping data. During the next swapping operation, data from the active internal cache block may be moved back to memory where it was previously received, e.g., the non-volatile memory, the external cache of the volatile memory, or the volatile memory, for example, when the data is modified. In addition, if the last memory operation was from a memory cache unit storing data received from the non-volatile memory, the data may be transferred to the volatile memory.

In some implementations, a seventh section 1914 can be used to indicate if there was any "WRITE" operation in the volatile memory unit of an internal cache block before swapping; and an eighth section 1916 can be used to indicate if there was any "WRITE" operation in the non-volatile memory unit of an internal cache block before swapping.

Figure 20:
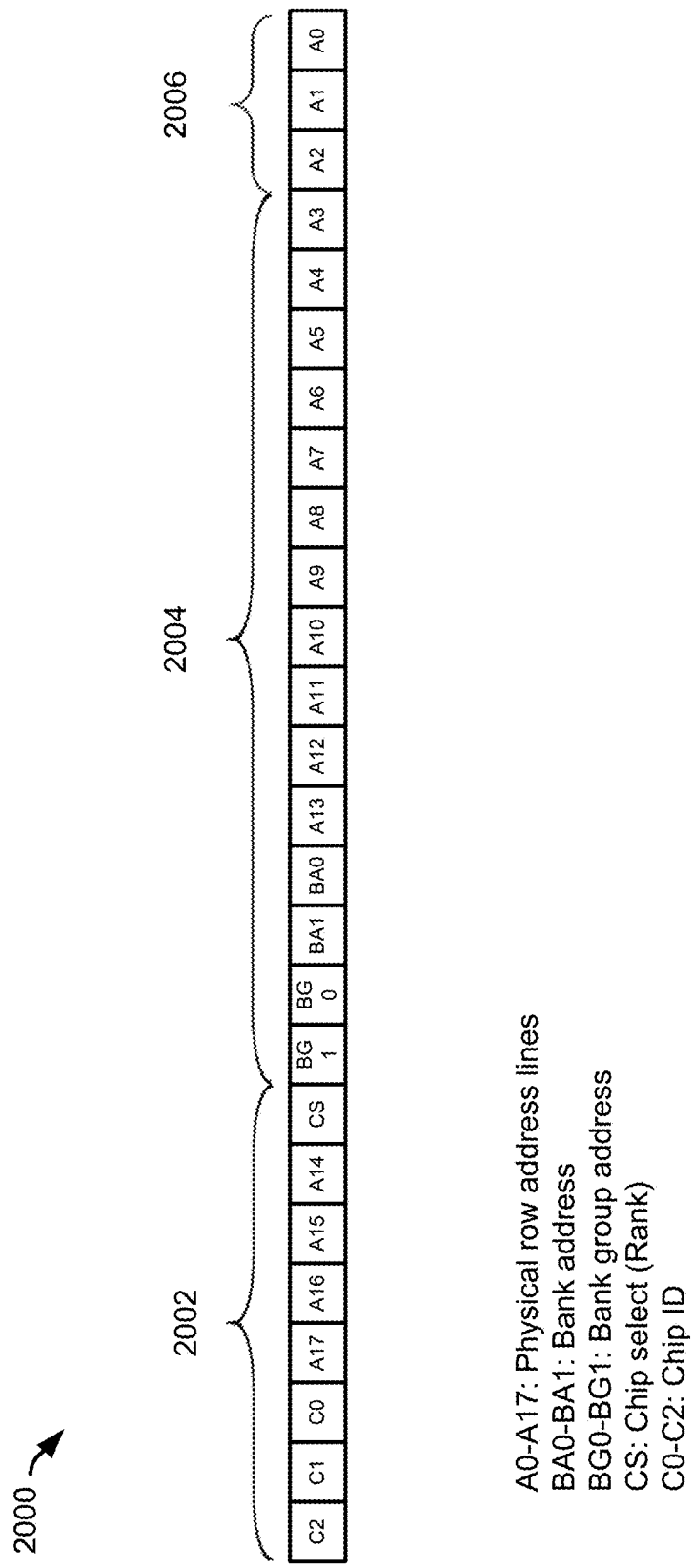
FIG. 20 is a schematic diagram showing an example row address.

FIG. 20 is a schematic diagram showing an example row address 2000. The example row address 2000 shown in FIG. 20 is a memory address in a memory access request issued by a host memory controller. In some instances, the memory address in a memory access request is translated according to a system physical address. For example, a physical address (e.g., 64-bits) is converted by a host memory controller into another format (e.g., a memory address) to access a particular memory module. In this case, a memory range for each memory module can be assigned by the system and the host memory controller accesses the memory module, when the memory range of a memory module falls in a range indicated in the memory access request. To translate a physical address to a memory address, the physical address is then divided into multiple sections indicating chip ID, rank, bank group, bank, row, column, or another type of information.

The example row address 2000 shown in FIG. 20 is segmented into three parts, e.g., a high part 2002, a middle part 2004, and a low part 2006. The structure and length of the high part 2002 of the row address is equal to the structure and length of each of the first and second sections 1902, 1904 of internal cache registers 1900. The structure and length of the middle part 2004 of the row address is equal to the structure and length of the third section 1906 of the internal cache register 1900. The length of the low part 2006 is equal to the lengths or size of each of the two memory cache units 1704 in each of the internal cache blocks 1702. In some implementations, the structure of the internal cache register in the memory module is determined based on the segmentation of a row address in a memory access request or in another manner.

Data in the low part 2006 of the row address 2000 is used to define a row in a volatile memory of a memory module (e.g., the volatile memory 1604 in the memory module 1600) that can be addressed. In certain implementations, data in the high part 2002 of the row address 2000 may be used to indicate whether data in the row is in the volatile memory. As shown in FIG. 20, the low part 2006 of the row address 2000 includes 3 bits for physical row addresses (e.g., A0-A2). The middle part 2004 of the row address 2000 contains 15 bits, including 10 bits for physical row addresses (e.g., A3-A13), 2 bits for bank addresses (e.g., BA0 and BA1), and 2 bits for bank group addresses (e.g., BG0 and BG1). The high part 2002 of the row address 2000 contains 8 bits including 3 bits for chip ID (e.g., C0-C2), 1 bit for chip select (e.g., CS), and 4 bits for the rest of the physical row address lines (e.g., A14-A17). The segmentation of the example row address 2000 shown in FIG. 20 is used in a memory module of total memory size of 512 GB with volatile memory of 2 GB. In some implementations, the row address may include different number of bits according to the memory sizes of the memory module and the volatile memory. In certain implementations, the row address may be implemented in another manner.

FIG. 21A is a flow diagram showing aspects of an example process 2100. The example process 2100 may be implemented in a memory system for cache management when performing a memory access request (e.g., performing "READ" or "WRITE" requests). In some instances, the memory system may be implemented as the memory system 100 shown in FIG. 1 or in another manner. In certain examples, aspects of the example process 2100 may be performed by a memory module, e.g., the memory module 1600, 1630 as shown in FIGS. 16A, 16B. In some instances, the memory module may include an internal cache (e.g., the internal cache 1618, 1648, 1700, 1710 in FIGS. 16A, 16B, 17A, 17B), a cache management controller (e.g., the cache management controller 1602, 1632, 1800 in FIG. 16A, 16B, 18), volatile memory (e.g., the volatile memory 1604 in FIG. 16A), or an external cache (e.g., the external cache 1650 of the volatile memory 1634 in FIG. 16B), and non-volatile memory (e.g., the non-volatile memory 1606, 1636 in FIGS. 16A, 16B). In some instances, the cache management controller may include an internal cache register, an interface memory controller, an active volatile pages map, and a hybrid memory internal interface controller, which may be implemented as the respective components shown in the example cache management controller 1800 of FIG. 18 or in another manner. The example process 2100 may include additional or different operations, and the operations may be performed in the order shown or in another order. In some cases, operations in the example process 2100 can be combined, iterated or otherwise repeated, or performed in another manner.

In some instances, the internal cache of the memory module may be a pre-determined partition, segment, or region within the volatile memory. In some instances, the partition of the volatile memory that is used as an internal cache can be configured in another manner. For example, the partition of the volatile memory that can be used as an internal cache may be specified by a host memory controller through a memory access request. In some instances, the internal cache is an independent unit from the volatile memory of the memory module or is configured in another manner.

In some implementations, the example process 2100 is performed on an internal cache with two internal cache blocks, e.g., an active internal cache block and a reserved cache block, as shown in FIG. 17B. Each of the active and reserved internal cache blocks is a segment of the internal cache. The process 2100 is performed according to the formats of the example internal cache register 1900 and the example row address 2000 shown in FIGS. 19, 20. The process 2100 may be modified, executed, and performed according to the configuration of the internal cache (e.g., number of internal cache blocks), the format of a row address and an internal cache register, or another parameter.

At 2102, a type of a memory access request is determined. In some instances, the memory module (e.g., the example memory module 1600 in FIG. 16A) receives a memory access request from a host memory controller via a memory interface (e.g., the memory interface 1620 in FIG. 16A). During operation 2102, whether the memory access request is a "READ" or "WRITE" request can be determined by operation of the memory module. In some instances, a type of the memory access request may be determined according to a request type in the memory access request or in another manner, for example the cache management controller of the memory module. The memory access request received from a host memory controller includes a requested memory address, a request type, data, or another type of information, as described above in FIG. 1. In response to the memory access request being determined as neither a "READ" request nor a "WRITE" request, the example process 2100 is terminated.

In response to the memory access request being either a "READ" request or a "WRITE" request, the process 2100 continues with operation 2104, in which a row address included in the memory access request is split into three parts, e.g., a high part, a middle part, and a low part, by operation of the cache management controller of the memory module (e.g., the cache management controller 1602 of the memory module 1600). For example, a row address may be split into the high part 2002, the middle part 2004, and the low part 2006 according to the format of the example row address 2000 shown in FIG. 20 or in another manner. The row address is or is at least part of the requested memory address in the memory access request. In some instances, the row address is split according to the total memory size of the memory module and the size of the volatile memory of the memory module. In certain instances, the row address may be split considering another parameter.

At 2106, data in the internal cache register is read. In some implementations, the data stored in the internal cache register is accessed by the cache management controller. In some instances, the data stored in the internal cache register is from a previously completed memory access process by processing a last received memory access request. For example, when a system is booted, it initializes all available memory modules. In some implementations, initializing a memory module includes either restoring the latest data that was in the memory module before powering off the system or performing a "fresh" initialization. A "fresh" initialization includes moving any predefined "initial data". For example, moving the initial data may include moving a memory page from the non-volatile memory 1606 to the volatile memory 1604 and the internal cache 1618 as shown in the example memory module 1600 of FIG. 16A, or moving a memory page from the non-volatile memory 1636 to both the external cache 1650 and the internal cache 1648 in the example memory module 1630 of FIG. 16B. In some instances, a fresh initialization also includes initializing the internal cache register 1900 accordingly. In some implementations, the data in the internal cache register may be organized in the data format of the example internal cache register 1900. In some instances, the data stored in the third section 1906 of the internal cache register 1900 is read.

At 2108, the middle part of the row address of the memory access request is compared with data stored in the third section of the internal cache register. For example, the middle part 2004 of the row address 2000 in a newly received memory access request is compared with the data stored in the third section 1906 of the internal cache register 1900 which is obtained from the previously completed memory access request. When the middle part of the row address is not equal to the third section of the data in the internal cache register, data requested in the memory access request is not stored in the internal cache (e.g., the internal cache 1608, 1648). In response to the middle part of the row address being not equal to the data stored in the third section in the internal cache register, the process 2100 continues with operation 2110.

Operations 2110, 2112, 2114, 2116 are operations during which accessing data in the active volatile pages map in the cache management controller of the memory module (e.g., the active volatile pages map 1804 of the cache management controller 1800 in FIG. 18) is performed.

At 2110, the active volatile memory map is accessed. In some implementations, an address for accessing the active volatile memory map is equal to the middle part 2004 of the row address received in the newly received memory access request.

At 2112, data stored at the address of the active volatile pages map is read. In some implementations, the data stored at the address of the active volatile pages map (e.g., the active volatile pages map 1804 of the cache management controller 1800 in FIG. 18) is accessed by the interface memory controller (e.g., the interface memory controller 1802 of the cache management controller 1800 in FIG. 18).

At 2114, the data stored at the address of the active volatile pages map is compared with the high part of the row address. For example, the high part 2002 of the row address 2000 of the newly received memory access request is compared with the data read from the address of the active volatile pages map 1604. In response to the data stored at the address of the active volatile page map being equal to the high part of the row address, the process 2100 continues with operation 2116 in which the memory access request is complete. For example, the requested data content can be read from or written to the volatile memory according to the middle part 2004 of the row address 2000 to complete the newly received memory access request. In response to the data stored at the address of the active volatile page map being not equal to the high part of the row address, the process 2100 continues with operation 2118 and a data transferring process (e.g., the data transferring process 2140 as shown in FIG. 21B) is performed.

When the middle part 2004 of the row address 2000 is equal to the data stored in the third section 1906 of the internal cache register 1900, data requested in the memory access request is stored in the internal cache (e.g., the internal cache 1608). Thus, in response to the middle part of the row address being equal to the third section of the data in the internal cache register during operation 2108, the process 2100 continues with operation 2120, during which data in the internal cache of the memory module (e.g., the internal cache 1618, 1648 in the memory module 1600, 1630 as shown in FIGS. 16A, 16B) can be accessed through operations 2120, 2124, 2126, 2128, 2130.

At 2120, data in the first section of the internal cache register is read. For example, the data in the first section 1902 of the internal cache register 1900 is accessed by the interface memory controller (e.g., the interface memory controller 1802 of the cache memory controller 1800 in FIG. 18).

At 2122, data in the high part of the row address is compared with the data in the first section of the internal cache register. For example, the data in the high part 2002 of the row address 2000 in the newly received memory access request is compared with the data in the first section 1902 of the internal cache register 1900. When the data in the high part 2002 of the row address 2000 is equal to the data in the first section 1902 of the internal cache register 1900, the requested data is stored in an internal cache unit of an active internal cache block which contains data from the volatile memory. In response to the data in the high part 2002 of the row address 2000 being equal to the data in the first section 1902 of the internal cache register 1900 during operation 2122, the process 2100 continues with operation 2124, during which the data in a second memory cache unit (e.g., the internal cache unit of the active internal cache block of the internal cache storing data from the volatile memory) is accessed and the newly received memory access request is complete.

In response to the data in the high part 2002 of the row address 2000 being not equal to the data in the first section 1902 of internal cache register 1900 during operation 2122, the process 2100 continues with operation 2126, during which data in the second section of the internal cache register is read. For example, the data in the second section 1904 of the internal cache register 1900 is accessed by the interface memory controller (e.g., the interface memory controller 1802 of the cache memory controller 1800 in FIG. 18)

At 2128, the data in the high part of the row address in the newly received memory access request is compared with data in the second section of the internal cache register. For example, the data in the high part 2002 of the row address 2000 is compared with data in the second section 1904 of the internal cache register 1900. In this case, when the data in the high part 2002 of the row address 2000 is equal to the data in the second section 1904 of the internal cache register 1900, the requested data is stored in an internal cache unit of the active internal cache block, which contains data from the non-volatile memory. In response to the data in the high part 2002 of the row address 2000 being equal to the data in the second section 1904 of the internal cache register 1900, the process 2100 continues with operation 2130, during which the data in a first memory cache unit of the active internal cache block (e.g., the internal cache unit of the active internal cache block in the internal cache storing data from the non-volatile memory) is accessed and the newly received memory access request is complete. In response to the data in the high part 2002 of the row address 2000 being not equal to the data in the second section 1904 of the internal cache register 1900 during operation 2128, the process 2100 continues with operation 2118, where a data transferring process (e.g., the data transferring process 2130 as shown in FIG. 21B) is performed. In some implementations, during this process, the memory module may also assert an "ALERT_n" signal to the host memory controller via the memory interface to halt the host memory controller.

FIG. 21B is a flow diagram showing aspects of an example process 2140. The example process 2140 may be implemented in a memory system for cache management when performing a data transferring process in response to a memory access request (e.g., performing "READ" or "WRITE" requests). In some instances, the memory system may be implemented as the memory system 100 shown in FIG. 1 or in another manner. In certain examples, aspects of the example process 2140 may be performed by a memory module, e.g., the memory modules 1600, 1630 as shown in FIGS. 16A, 16B. In some instances, the memory module may include an internal cache (e.g., the internal cache 1618, 1648, 1700, 1710 in FIGS. 16A, 16B, 17A, 17B), a cache management controller (e.g., the cache management controller 1800 in FIG. 18), volatile memory, and non-volatile memory. In some instances, the cache management controller includes an internal cache register, an interface memory controller, an active volatile pages map, and a hybrid memory internal interface controller, which may be implemented as the respective components shown in the example cache management controller 1800 of FIG. 18 or in another manner. The example process 2140 may include additional or different operations, and the operations may be performed in the order shown or in another order. In some cases, operations in the example process 2140 can be combined, iterated or otherwise repeated, or performed in another manner.

During operations 2142, 2144, 2146, 2148, 2150, 2152, and 2154, a first data transferring subprocess for transferring data from an active internal cache block of the internal cache to one of the volatile memory or the non-volatile memory is performed. During operations 2160, 2162, and 2164 a second data transferring subprocess for transferring data from both of the non-volatile memory and the volatile memory to a reserved internal cache block of the internal cache is performed. In some implementations, operations 2142 and 2160, operations 2148 and 2146, and operations 2162 and 2164 are executed in parallel.

At 2142, the first data transferring subprocess is started. At 2144, data stored in a second internal cache unit of the active internal cache block (e.g., the internal cache unit of the active internal cache block in the internal cache storing data from the volatile memory) and received from the volatile memory is transferred to the non-volatile memory. At 2146, data stored in a first internal cache unit of the active internal cache block (e.g., the internal cache unit of the active internal cache block in the internal cache storing data from the non-volatile memory) and received from the non-volatile memory is read and checked to determine if the data has been modified. In some instances, whether or not the data has been modified can be indicated by the value of a section in the internal cache register (e.g., the seventh section 1914 of the internal cache register 1900 in FIG. 19). In some instances, whether the data has been modified can be indicated by a dedicated bit in the associated memory cache unit or in another manner. In some instances, the data stored in a second internal cache unit is accessed and checked by the cache management controller. In response to the data stored in the second internal cache unit being modified, the process 2140 continues with operation 2148, during which the data is transferred from the first internal cache unit of the active internal cache block back to the non-volatile memory. In some instances, an address of the non-volatile memory where the data is received and stored can be determined according to the internal cache register (e.g., the first section 1902 and the third section 1906 of the internal cache register 1900 in FIG. 19). In response to the data in the second internal cache unit being unmodified as determined during operation 2146, the data transfer being completed during operation 2144, or the data transfer being completed during operation 2148, the process 2140 continues with operation 2150, data stored in a last-access bit of the internal cache register is read. For example, the data stored in the fifth section 1910 of the internal cache register 1900 in FIG. 19 can be read. The process 2140 continues with operation 2152, whether the first internal cache unit of the active internal cache block is accessed during the last memory access request is determined according to the data stored in the last-access bit of the internal cache register. In response to the last memory access being in the non-volatile memory, the process 2140 continues with operation 2154, during which the data stored in the first internal cache unit of the active internal cache block is transferred to the volatile memory (e.g., the volatile memory 1604 in FIG. 16A or the external cache 1650 of the volatile memory 1634 in FIG. 16B) and the active volatile pages map is updated by saving the data represented in the high part of the row address in an address of the active volatile pages map. The address of the active volatile pages map storing the high part of the row address is determined by the middle part of the row address.

At 2160, the second data transferring subprocess is started. In some implementations, data from the non-volatile memory and the volatile memory is transferred to corresponding internal cache units of the reserved internal cache block of the internal cache.

At 2162, data is transferred from an address of the non-volatile memory to a third internal cache unit of the reserved internal cache block of the internal cache. In this case, the address of the non-volatile memory is determined by the high part 2002 and the middle part 2004 of the row address of the memory access request. At 2164, data is transferred from an address of the volatile memory (e.g., the volatile memory 1604 in FIG. 16A or the external cache 1650 of the volatile memory 1634 in FIG. 16B) to a fourth internal cache unit of the reserved internal cache block of the internal cache. In this case, the address of the volatile memory is determined by the data stored in the active volatile pages map and the internal cache register (e.g., the high part stored in the active volatile pages map and the middle part of the row address of the memory access request). When the first and second data transferring subprocess (e.g., operations 2142, 2144, 2146, 2148, 2150, 2152, 2154) are completed, the process 2140 continues with operation 2166, during which the fourth section of the internal cache register is updated. In some implementations, the internal cache register 1900 is updated by reversing the bit in the fourth section 1908. In this case, the reserved internal cache block of the internal cache becomes activated. In this case, the reserved internal cache block becomes a newly activated internal cache block which is ready to be accessed in a following data transferring process and the current memory access request is complete.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data-processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include codes, in addition to hardware, that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media, and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of what is described above, a hybrid memory system with cache management is disclosed.

In a first example, a memory access request is transmitted by operation of a host memory controller to a memory module via a memory interface. Whether to execute the memory access request is determined by operation of the memory module according to one or more specifications of the memory interface. In response to determining the memory access request cannot be executed according to the one or more specifications of the memory interface, the host memory controller is notified by the memory module and halted. Respective actions are performed by operation of the memory module based on the memory access request and the type of the memory module.

In a second example, a system includes a host memory controller, a memory interface, and a memory module. The memory module is communicably coupled to the host memory controller via the memory interface. The memory module is configured to perform operations including: receiving a memory access request from the memory controller; determining whether to execute the memory access request according to one or more specifications of the memory interface; in response to determining the memory access request cannot be executed according to the one or more specifications of the memory interface, notifying the host memory controller and halting the host memory controller; and performing respective actions based on the memory access request and a type of the memory module.

Implementations of the first, or second example may include one or more of the following features. In response to determining the memory access request can be executed according to one or more specifications of the memory interface, the memory access request is complete. The memory interface includes a dual data rate (DDR) memory interface and the memory module includes a dual in-line memory module (DIMM). When notifying the host memory controller, a signal is transmitted to the host memory controller, by operation of the DIMM to inform the host memory controller that the memory access request cannot be executed according to the one or more specifications of the memory interface.

Implementations of the first or second example may include one or more of the following features. The memory module is a hybrid memory DIMM, and the hybrid memory DIMM includes volatile memory, non-volatile memory, and a cache management controller. The cache management controller is communicably coupled between the volatile and non-volatile memory. After halting the host memory controller, data is swapped between the volatile memory and the non-volatile memory of the hybrid memory DIMM. In response to determining the memory access request can be executed according to one or more specifications of the memory interface, the memory access request is transferred to the volatile memory of the DIMM to complete the memory access request. The volatile memory of the DIMM includes random access memory (RAM), dynamic RAM, embedded DRAM, or a combination thereof. The non-volatile memory of the DIMM includes flash memory, ferroelectric RAM (F-RAM), magnetoresistive RAM (M-RAM), spin-transfer torque RAM (STT-RAM), resistive RAM (R-RAM), ferroelectric field-effect transistor (Fe FET), phase-change memory (PCM), or a combination thereof.

Implementations of the first, or second example may include one or more of the following features. The memory module is a processing in memory (PIM) module. The PIM module includes a processing unit, volatile memory, and a PIM memory control unit. The memory access request includes a memory address and a request type. Whether the memory address is stored in the PIM memory control unit is determined according to the request type by operation of the PIM memory control unit. The PIM memory control unit includes a PIM status operation register, a PIM control operation register, and a PIM operation logic. In response to the request type being "READ", whether the memory address is stored in the PIM status operation register is determined by operation of the PIM operation logic. In response to the request type being "WRITE", whether the memory address is stored in the PIM control operation register is determined by operation of the PIM operation logic. The PIM module includes non-volatile memory and a cache management controller. The cache management controller is communicably coupled between the volatile and non-volatile memory. After halting the host memory controller, data is swapped between the volatile memory and the non-volatile memory of the PIM module.

Implementations of the first or second example may include one or more of the following features. The signal comprises an ALERT_n signal. The memory access request includes a first memory access request. The host memory controller includes a memory control unit, a first queue, and a second queue. The first queue includes a first subset of memory access requests, and the second queue includes a second subset of memory access requests. The first subset includes memory access requests that can be executed according to one or more specifications of the memory interface, and the second subset includes memory access requests that fail to be executed according to one or more specifications of the memory interface. A second memory access request from the first queue is read by operation of the memory control unit. Whether the ALERT_n signal is asserted is determined by operation of the memory control unit according to the one or more specifications of the memory interface and the second memory access request. In response to the ALERT_n signal being asserted, the second memory access request is transferred to the second queue. In response to the ALERT_n signal not being asserted, the second memory access request is complete. A third memory access request is read from the second queue. A timer is initiated according to the third memory access request and the one or more specifications of the memory interface. In response to the timer being expired, the third memory access request is transferred from the second queue to the first queue.

In a third example, a memory access request is transmitted by operation of a host memory controller, to a memory module via a memory interface. The memory access request includes a memory address. The memory address includes a first section and a second section. Whether to execute the memory access request according to the first and second sections in the memory address is determined by operation of the memory module. The memory module includes volatile memory, non-volatile memory, and a cache management controller. In response to determining the memory access request cannot be executed according to the first and second sections in the memory address, the host memory controller is halted. Data swapping between the volatile memory and the non-volatile memory is performed by operation of the memory module.

In a fourth example, a system includes a host memory controller, a memory interface, and a memory module. The memory module is communicably coupled to the host memory controller via the memory interface. The memory module is configured to perform operations including receiving a memory access request from the host memory controller. The memory access request includes a memory address. The memory address includes a first section and a second section. The operations further include determining whether to execute the memory access request according to the first and second sections in the memory address. The memory module includes volatile memory, non-volatile memory, and a cache management controller. The operations further include, in response to determining the inability of the memory access request being executed according to the first and second sections in the memory address, halting the host memory controller and performing data swapping between the volatile memory and the non-volatile memory.

Implementations of the third or fourth example may include one or more of the following features. The first section of the memory address indicates an address in the volatile memory. The cache management controller includes an interface memory controller and an active volatile pages map. The interface memory controller is configured to manage DDR transactions in the memory module. The second section of the memory address and data stored at the address in the active volatile pages map are compared. In response to the second section not being equal to the data stored at the address, before the host memory controller is halted, a signal is transmitted to the host memory controller by operation of the interface memory controller, to inform the host memory controller that the memory access request has not been executed. The memory address of the memory access request includes a first memory address. The data stored at the address in the active volatile pages map includes first data. The data stored at the address in the volatile memory is transferred to a second memory address in the non-volatile memory. The second memory address is defined by the first section of the first memory address and the first data. Second data stored at the first memory address in the non-volatile memory is transferred to the address in the volatile memory. The memory module includes a power backup unit configured to perform the data swapping in case of a power outage or a system failure. The memory module includes a network interface. The network interface is communicably coupled between the non-volatile memory and the memory interface. The memory module includes an external input/output (I/O) interface.

In a fifth example, a memory module includes volatile memory, non-volatile memory, and an internal cache. The internal cache is communicably coupled with the volatile memory and the non-volatile memory. Whether to execute a memory access request is determined by operation of the memory module. In response to the memory access request inability to execute the memory access request, a data transferring process is performed to copy data between the volatile memory and the non-volatile memory via the internal cache.

Implementations of the fifth example may include one or more of the following features. The memory access request is received by the memory module from a host memory controller via a memory interface. The host memory controller is communicably coupled with the memory module via the memory interface. The memory access request includes a memory address. Before determining whether to execute the memory access request, the memory address is segmented, by operation of the memory module, into a first section, a second section, and a third section. The first section corresponds to a first range of bits of the memory address; the second section corresponds to a second, distinct range of bits; and the third section corresponds to a third, distinct range of bits. The memory module includes a cache management controller, which includes an internal cache register. The internal cache register of the cache management controller includes a first section which corresponds to a first range of bits of the internal cache register. When determining whether to execute the memory access request, data in the first section of the internal cache register is read and compared with data in the second section of the memory address.

Implementations of the fifth example may include one or more of the following features. The cache management controller includes an interface memory controller and an active volatile pages map. The interface memory controller is configured to manage DDR transactions in the memory module. The active volatile pages map stores information about active pages of the volatile memory. If the data in the second section of the memory address is not equal to the data in the first section of the internal cache register, data stored at an address of the active volatile pages map is read. The address of the active volatile pages map is determined based on data stored in the second section of the memory address. The data in the first section of the memory address and the data stored at the address in the active volatile pages map is then compared. If the data in the first section of the memory address is not equal to the data stored at the address in the active volatile pages map, the data transferring process to copy data between the volatile memory and the non-volatile memory is performed via the internal cache. The internal cache register includes a second section and a third section. The second section corresponds to a second, distinct range of bits in the internal cache register; and the third section corresponds to a third, distinct range of bits in the internal cache register. If the data in the second section of the memory address is equal to the data in the first section of the internal cache register, data in the second section of the internal cache register is read and compared with the data in the first section of the memory address. If the data in the second section of the internal cache register is not equal to the data in the first section of the memory address, data in the third section of the internal cache register is read and compared with the data in the first section of the memory address. If the data in the third section of the internal cache register is not equal to the data in the first section of the memory address, the data transferring process to copy data between the volatile memory and the non-volatile memory is performed via the internal cache.

Implementations of the fifth example may include one or more of the following features. The internal cache includes a first internal cache block and a second internal cache block. The first internal cache block includes a first portion of the internal cache, the second internal cache block comprises a second, distinct portion of the internal cache. The data transferring process to copy data between the volatile memory and the non-volatile memory via the internal cache includes at least one of a first data transferring subprocess or a second data transferring process. The first data transferring subprocess is configured to transfer data from the first internal cache block to at least one of the volatile memory or the non-volatile memory. The second data transferring subprocess is configured to transfer data from the volatile memory and the non-volatile memory to the second internal cache block. The first internal cache block includes a first memory cache unit and a second memory cache unit. When the first data transferring subprocess is performed, whether data stored in the first memory cache unit of the first internal cache block is modified is determined. If the data stored in the first memory cache unit of the first internal cache block is modified, the data from the first memory cache unit of the first internal cache block is transferred to the non-volatile memory. The memory module includes a cache management controller, and the cache management controller includes an internal cache register and an active volatile pages map. The internal cache register is configured to store information about the internal cache; and the active volatile pages map is configured to store information about active pages of the volatile memory. If the data stored in the first memory cache unit of the first internal cache block is determined as being unmodified, whether a previous memory access process is performed in the non-volatile memory is determined. If the previous memory access process is performed in the non-volatile memory, the data in the first memory cache unit of the first internal cache block is transferred to the volatile memory. Data stored in the active volatile pages map is then updated. When the data stored in the active volatile pages map is updated, data in the first section of the memory address in the memory access request is copied to an address of the active volatile pages map. The address of the active volatile pages map is determined based on the second section of the memory address in the memory access request.

Implementations of the fifth example may include one or more of the following features. The second internal cache block includes a first memory cache unit and a second memory cache unit. When the second data transferring subprocess is performed, data stored in an address of the non-volatile memory is transferred to the first memory cache unit of the second internal cache block; and data stored in an address of the volatile memory is transferred to the second memory cache unit of the second internal cache block. Data stored in the internal cache register is updated.

In a sixth example, a memory module includes non-volatile memory, first volatile memory, second volatile memory, and a cache management controller. The cache management controller is configured to perform operations including determining whether to execute a memory access request; and in response to determining the memory access request cannot be executed, performing a data transferring process to copy data between the first volatile memory and the non-volatile memory via the second volatile memory.

Implementations of the sixth example may include one or more of the following features. The first volatile memory comprises dynamic random-access memory (DRAM) and the second volatile memory comprises static random-access memory (SRAM).

In a seventh example, a memory module includes non-volatile memory, volatile memory, and means for storing intermediate data during a data transferring process. The data transferring process is configured to copy data between the non-volatile memory and the volatile memory in a memory access process.

Implementations of the seventh example may include one or more of the following features. The volatile memory includes first volatile memory, and the means for storing the intermediate data includes second volatile memory. The first volatile memory includes dynamic random-access memory (DRAM) and the second volatile memory includes static random-access memory (SRAM). The volatile memory includes dynamic random-access memory (DRAM); and the volatile memory includes a first portion and a second portion. The data transferring process is configured to copy data between the non-volatile memory and the first portion of the volatile memory via the second portion of the volatile memory.

The memory access process includes receiving a memory access request from a host memory controller via a memory interface, wherein the host memory controller is communicably coupled to the memory module via the memory interface; determining whether to execute the memory access request; and in response to determining the memory access request cannot be executed, performing the data transferring process to copy data between the volatile memory and the non-volatile memory via the means for storing the intermediate data. The memory access request includes a memory address. The memory access process further comprises, prior to determining whether to execute the memory access request, segmenting the memory address into a first section, a second section, and a third section. The first section corresponds to a first range of bits of the memory address; the second section corresponds to a second, distinct range of bits; and third section corresponds to a third, distinct range of bits.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A cache management method for operating a memory module, the memory module comprising volatile memory, non-volatile memory, an internal cache, and a cache management controller, the internal cache being communicably coupled with each of the volatile memory and the non-volatile memory, the cache management controller comprising an internal cache register comprising a first section, an interface memory controller configured to manage DDR transactions in the memory module, and an active volatile pages map storing information about active pages of the volatile memory, the first section corresponding to a first range of bits of the internal cache register, and the method comprising:

determining whether to execute a memory access request, the memory access request comprising a memory address;

prior to determining whether to execute the memory access request, segmenting, by operation of the memory module, the memory address into a first section, a second section, and a third section, wherein the first section corresponds to a first range of bits of the memory address, the second section corresponds to a second, distinct range of bits of the memory address, and third section corresponds to a third, distinct range of bits of the memory address, wherein determining whether to execute the memory access request comprises:

reading data in the first section of the internal cache register;

comparing the data in the first section of the internal cache register and data in the second section of the memory address;

in response to the data in the second section of the memory address being not equal to the data in the first section of the internal cache register, reading data stored at an address of the active volatile pages map, the address of the active volatile pages map being determined based on the data stored in the second section of the memory address; and comparing the data in the first section of the memory address and the data stored at the address of the active volatile pages map; and in response to determining the memory access request cannot be executed, performing a data transferring process to copy data between the volatile memory and the non-volatile memory via the internal cache, wherein determining the memory access request cannot be executed comprises determining the data in the first section of the memory address is not equal to the data stored at the address of the active volatile pages map.

2. The method of claim 1, comprising:
receiving, by operation of the memory module, the memory access request from a host memory controller via a memory interface, wherein the host memory controller is communicably coupled with the memory module via the memory interface.

3. The method of claim 1, wherein the internal cache register comprises a second section and a third section, the second section corresponds to a second, distinct range of bits in the internal cache register, the third section corresponds to a third, distinct range of bits in the internal cache register, and the method comprises:
in response to the second section of the memory address being equal to the data in the first section of the internal cache register, reading data in the second section of the internal cache register; and
comparing the data in the second section of the internal cache register with the data in the first section of the memory address.

4. The method of claim 3, wherein
in response to the data in the second section of the internal cache register being not equal to the data in the first section of the memory address, reading data in the third section of the internal cache register;
comparing the data in the third section of the internal cache register with the data in the first section of the memory address; and
in response to the data in the third section of the internal cache register being not equal to the data in the first section of the memory address, performing the data transferring process to copy data between the volatile memory and the non-volatile memory via the internal cache.

5. The method of claim 1, wherein the internal cache comprises a first internal cache block and a second internal cache block, the first internal cache block comprises a first portion of the internal cache, the second internal cache block comprises a second, distinct portion of the internal cache, and performing the data transferring process to copy data between the volatile memory and the non-volatile memory via the internal cache comprises at least one of:
performing a first data transferring subprocess, the first data transferring subprocess is configured to transfer data from the first internal cache block to at least one of the volatile memory or the non-volatile memory; or
performing a second data transferring subprocess, the second data transferring subprocess is configured to transfer data from the volatile memory and the non-volatile memory to the second internal cache block.

6. The method of claim 5, wherein the first internal cache block comprises a first memory cache unit and a second memory cache unit, performing the first data transferring subprocess comprises:
determining whether data stored in the first memory cache unit of the first internal cache block is modified; and
upon determining the data stored in the first memory cache unit of the first internal cache block being modified, transferring the data from the first memory cache unit of the first internal cache block to the non-volatile memory.

7. The method of claim 6, comprising:
upon determining the data stored in the first memory cache unit of the first internal cache block as being unmodified, determining whether a previous memory access process is performed in the non-volatile memory;
in response to the previous memory access process being performed in the non-volatile memory, transferring the data in the first memory cache unit of the first internal cache block to the volatile memory; and
updating the data stored at the address of the active volatile pages map.

8. The method of claim 7, wherein updating the data stored at the address of the active volatile pages map comprises:
copying the data in the first section of the memory address in the memory access request to the address of the active volatile pages map.

9. The method of claim 5, wherein the second internal cache block comprises a first memory cache unit and a second memory cache unit, and performing the second data transferring subprocess comprises:
transferring data stored in an address of the non-volatile memory to the first memory cache unit of the second internal cache block; and
transferring data stored in an address of the volatile memory to the second memory cache unit of the second internal cache block.

10. The method of claim 9, further comprising:
updating data stored in the internal cache register.

11. A memory module comprising:
non-volatile memory;
first volatile memory;
second volatile memory, the second volatile memory being communicably coupled with each of the first volatile memory and the non-volatile memory; and
a cache management controller comprising an internal cache register comprising a first section, an interface memory controller configured to manage DDR transactions in the memory module, and an active volatile pages map storing information about active pages of the first volatile memory, the first section corresponding to a first range of bits of the internal cache register, the cache management controller configured to perform operations comprising:
determining whether to execute a memory access request, the memory access request comprising a memory address;
prior to determining whether to execute the memory access request, segmenting, by operation of the memory module, the memory address into a first section, a second section, and a third section, wherein the first section corresponds to a first range of bits of the memory address, the second section corresponds to a second, distinct range of bits of the memory address, and third section corresponds to a third, distinct range of bits of the memory addresss, wherein determining whether to execute the memory access request comprises, reading data in the first section of the internal cache register;

comparing the data in the first section of the internal cache register and data in the second section of the memory address;

in response to the data in the second section of the memory address being not equal to the data in the first section of the internal cache register, reading data stored at an address of the active volatile pages map, the address of the active volatile pages map being determined based on the data stored in the second section of the memory address; and comparing the data in the first section of the memory address and the data stored at the address of the active volatile pages map; and in response to determining the memory access request cannot be executed, performing a data transferring process to copy data between the first volatile memory and the non-volatile memory via the second volatile memory, wherein determining the memory access request cannot be executed comprises determining the data in the first section of the memory address is not equal to the data stored at the address of the active volatile pages map.

12. The memory module of claim 11, wherein the first volatile memory comprises dynamic random-access memory (DRAM) and the second volatile memory comprises static random-access memory (SRAM).

13. A cache management method for operating a memory module, the memory module comprising volatile memory, non-volatile memory, an internal cache, and a cache management controller, the internal cache being communicably coupled with each of the volatile memory and the non-volatile memory, the cache management controller comprising an internal cache register, the internal cache register comprises a first section corresponding to a first range of bits of the internal cache register, a second section corresponding to a second, distinct range of bits in the internal cache register, and a third section corresponding to a third, distinct range of bits in the internal cache register, the method comprising:

determining whether to execute a memory access request comprising a memory address;

prior to determining whether to execute the memory access request, segmenting, by operation of the memory module, the memory address into a first section, a second section, and a third section, wherein the first section corresponds to a first range of bits of the memory address, the second section corresponds to a second, distinct range of bits of the memory address, and the third section corresponds to a third, distinct range of bits of the memory address, wherein determining whether to execute the memory access request comprises, reading data in the first section of the internal cache register;

comparing the data in the first section of the internal cache register and data in the second section of the memory address;

in response to the data in the second section of the memory address being equal to the data in the first section of the internal cache register, reading data in the second section of the internal cache register;

comparing the data in the second section of the internal cache register with the data in the first section of the memory address;

in response to the data in the second section of the internal cache register being not equal to the data in the first section of the memory address, reading data in the third section of the internal cache register; and comparing the data in the third section of the internal cache register with the data in the first section of the memory address; and in response to determining the memory access request cannot be executed, performing a data transferring process to copy data between the volatile memory and the non-volatile memory via the internal cache, wherein determining the memory access request cannot be executed comprises determining the data in the third section of the internal cache register is not equal to the data in the first section of the memory address.

14. The method of claim 13, wherein the internal cache comprises a first internal cache block and a second internal cache block, the first internal cache block comprises a first portion of the internal cache, the second internal cache block comprises a second, distinct portion of the internal cache, and performing the data transferring process to copy data between the volatile memory and the non-volatile memory via the internal cache comprises at least one of:

performing a first data transferring subprocess, the first data transferring subprocess is configured to transfer data from the first internal cache block to at least one of the volatile memory or the non-volatile memory; or performing a second data transferring subprocess, the second data transferring subprocess is configured to transfer data from the volatile memory and the non-volatile memory to the second internal cache block.

15. The method of claim 14, wherein the first internal cache block comprises a first memory cache unit and a second memory cache unit, performing the first data transferring subprocess comprises:

determining whether data stored in the first memory cache unit of the first internal cache block is modified; and upon determining the data stored in the first memory cache unit of the first internal cache block being modified, transferring the data from the first memory cache unit of the first internal cache block to the non-volatile memory.

16. The method of claim 15, wherein the internal cache register stores information about the internal cache and the cache management controller further comprises an active volatile pages map storing information about active pages of the volatile memory, and the method comprises:

upon determining the data stored in the first memory cache unit of the first internal cache block as being unmodified, determining whether a previous memory access process is performed in the non-volatile memory;

in response to the previous memory access process being performed in the non-volatile memory, transferring the data in the first memory cache unit of the first internal cache block to the volatile memory; and updating data stored in the active volatile pages map.

17. The method of claim 16, wherein updating the data stored in the active volatile pages map comprises:

copying the data in the first section of the memory address in the memory access request to an address of the active volatile pages map, the address of the active volatile pages map is determined based on the data in the second section of the memory address in the memory access request.

18. The method of claim 14, wherein the second internal cache block comprises a first memory cache unit and a second memory cache unit, and performing the second data transferring subprocess comprises:
   transferring data stored in an address of the non-volatile memory to the first memory cache unit of the second internal cache block; and
   transferring data stored in an address of the volatile memory to the second memory cache unit of the second internal cache block.

19. The method of claim 18, further comprising:
   updating data stored in the internal cache register.

20. The method of claim 13, comprising:
   receiving, by operation of the memory module, the memory access request from a host memory controller via a memory interface, wherein the host memory controller is communicably coupled with the memory module via the memory interface.

* * * * *

UNITED STATES PATENT AND TRADEMARK OFFICE
CERTIFICATE OF CORRECTION

| | |
|---|---|
| PATENT NO. | : 11,526,441 B2 |
| APPLICATION NO. | : 17/321614 |
| DATED | : December 13, 2022 |
| INVENTOR(S) | : Sharovar |

It is certified that error appears in the above-identified patent and that said Letters Patent is hereby corrected as shown below:

On the Title Page

Item (73), Column 1, Assignee information, delete "Truememory Technology, LLC" and replace with -- Truememorytechnology, LLC -- therefor.

Signed and Sealed this
Twenty-eighth Day of March, 2023

Katherine Kelly Vidal
*Director of the United States Patent and Trademark Office*